(12) United States Patent
Winslade et al.

(10) Patent No.: US 8,533,039 B1
(45) Date of Patent: Sep. 10, 2013

(54) SYSTEM FOR ONLINE SALES WITH AUTOMATIC REBATE AND COUPON REDEMPTION

(76) Inventors: Christopher C. Winslade, Chicago, IL (US); James D. Bennett, Austin, TX (US)

( * ) Notice: Subject to any disclaimer, the term of this patent is extended or adjusted under 35 U.S.C. 154(b) by 2032 days.

(21) Appl. No.: 09/687,499

(22) Filed: Oct. 13, 2000

Related U.S. Application Data

(63) Continuation-in-part of application No. 09/547,162, filed on Apr. 11, 2000, now abandoned.

(60) Provisional application No. 60/130,084, filed on Apr. 19, 1999, provisional application No. 60/130,082, filed on Apr. 19, 1999, provisional application No. 60/130,083, filed on Apr. 19, 1999, provisional application No. 60/131,008, filed on Apr. 23, 1999, provisional application No. 60/144,584, filed on Jul. 19, 1999, provisional application No. 60/146,208, filed on Jul. 28, 1999, provisional application No. 60/147,062, filed on Aug. 4, 1999, provisional application No. 60/159,388, filed on Oct. 14, 1999.

(51) Int. Cl.
*G06Q 30/00* (2012.01)

(52) U.S. Cl.
USPC ............... 705/14.39; 705/14.1; 705/14.34

(58) Field of Classification Search
USPC ............... 705/14, 64, 14.1, 14.34, 14.39
See application file for complete search history.

(56) References Cited

U.S. PATENT DOCUMENTS

| | | | | | |
|---|---|---|---|---|---|
| 4,882,675 | A | * | 11/1989 | Nichtberger et al. | 705/14 |
| 5,729,693 | A | * | 3/1998 | Holda-Fleck | 705/14 |
| 5,937,391 | A | * | 8/1999 | Ikeda et al. | 705/14 |
| 5,943,424 | A | * | 8/1999 | Berger et al. | 705/64 |
| 6,009,412 | A | * | 12/1999 | Storey | 705/14 |
| 6,055,513 | A | * | 4/2000 | Katz et al. | 705/26 |
| 6,370,514 | B1 | * | 4/2002 | Messner | 705/14 |
| 6,385,591 | B1 | * | 5/2002 | Mankoff | 705/14 |
| 6,505,773 | B1 | * | 1/2003 | Palmer et al. | 235/380 |
| 6,594,640 | B1 | * | 7/2003 | Postrel | 705/14 |
| 6,915,271 | B1 | * | 7/2005 | Meyer et al. | 705/14 |
| 2002/0052778 | A1 | * | 5/2002 | Murphy et al. | 705/14 |

* cited by examiner

*Primary Examiner* — Yehdega Retta

(57) ABSTRACT

Disclosed herein is a method and system for online sales providing automatic rebate and coupon redemption corresponding to online purchases. Purchase orders from customers may be fulfilled and the products shipped to customers by the system for online sales with automatic rebate and coupon redemption. The system may provide customers with the ability to make online purchases using applicable coupons and rebates from merchants or manufacturers thereby passing the savings on to the customer. The system may also automatically retrieve coupons and rebates for use during an online purchasing activity for items in a shopping cart during a shopping activity.

5 Claims, 11 Drawing Sheets

SYSTEM FOR ONLINE SALES WITH AUTOMATIC REBATE AND COUPON REDEMPTION

CROSS-REFERENCE TO RELATED APPLICATIONS

This application is a continuation-in-part of U.S. application Ser. No. 09/547,162 filed Apr. 11, 2000 now abandoned, which is based on and claims the benefit of U.S. provisional applications Ser. Nos. 60/130,084 (filed Apr. 19, 1999), 60/130,082 (filed Apr. 19, 1999), 60/130,083 (filed Apr. 19, 1999), 60/131,008 (filed Apr. 23, 1999), 60/144,584 (filed Jul. 19, 1999), 60/146,208 (filed Jul. 28, 1999), 60/147,062 (filed Aug. 4, 1999), and 60/159,388 (filed Oct. 14, 1999). The above-identified applications are all hereby incorporated herein by reference in their entirety and constitute part of the present application.

BACKGROUND

1. Technical Field

The present invention relates generally to online sales and marketing, and, more specifically, to the dispensing of rebates and coupons to customers on the Internet and to the redemption of the rebates and coupons for customers by a system for online sales during online purchase on the Internet.

2. Related Art

Coupons have been traditionally dispensed by manufacturers and retailers to customers by means of inserts in newspapers. Some manufacturers also mail coupons to customers. Rebates have traditionally been offered by manufacturers to push the volume of sales of specific products. Such products are typically those for which the manufacturers have excess inventories or those that are being phased out.

Of late Internet based sales have increased in volume. Some manufacturers have made it possible for a potential customer to obtain rebate forms or coupons from their web site. These rebate or coupons can be downloaded and printed by customers to be redeemed in traditional neighborhood stores.

In general, there are several problems associated with dispensing and redeeming coupons in online sales and marketing activities. These include the frequent inability of a customer to use a coupon placed by an advertiser or merchant in a newspaper or brochure during the activity of online product purchase due to the remoteness of the merchant or vendor. That is because traditional coupon delivery and redeeming methods do not integrate well with Internet based sales where a customer visits a vendor or merchant's web site rather than a store for purchases. The customer and the vendor are also typically located in different cities and it is not possible to redeem traditional coupons in such a scenario.

These problems are also true for manufacturer's rebates. Such rebates are typically dispensed in traditional neighborhood stores and are to be mailed back to manufacturers with receipts for the related purchases. Customer's seldom redeem them as redemption requires making a photocopy of their receipts and mailing the receipts along with the rebates to the manufacturer and waiting a few weeks for a check from the manufacturer.

Sellers often provide coupons and rebates as an incentive to promote sales of specific products. A manufacturer attempts to identify the amount and quantity of each rebate or coupon and the time period during which such offer will be valid. Such rebates and coupons are typically delivered in a paper form to distributors and retailers. Distributors receiving such rebates and coupons further forward the rebates and coupons to their associated retailers.

To use the rebates and coupons online, the retailer often has to modify the product database, web server content, and, possibly, its sales application. This burden along with the burden of having to collect from the manufacturer dissuades the retailer from participating in the rebate and coupon process. Without knowing whether or to what extent the retailers will participate, a manufacturer may under or overestimate the number or amount of rebates or coupon offerings.

An overestimation may, for example, cause a manufacturer to over sell a product beyond an inventory. Similarly, an underestimation may fail to move an inventory before the value of such inventory plummets. Complicating this problem, a manufacturer by law must honor any coupon or rebate once distributed at least for a period of time identified on the rebate or coupon.

In addition to the difficulties associated with integrating rebates and coupons into their online sales systems, retailers have monetary disincentives to do so. In particular, a retailer typically purchases goods expecting a certain profit margin upon selling such goods. To apply a manufacturer's coupon or rebate at the time of the sale requires the retailer to seek at least a part, if not all of their profit from the manufacturer 30-90 days after making the sale.

Some online retailer offer their own "coupons and rebates", hoping to capture the attention of price conscience buyers. Such online retailers who post their own coupons or rebates are typically suspect in creating a façade pricing scheme.

Because retailers have little incentive to provide support for manufacturer's coupons and rebates on-line, buyers are left with coupon rebate options. In some cases, buyers may still use such coupons and rebates but must do so via post (snail mail) and subsequently receive the redemption value via return post.

After receiving a product, if a buyer is interested in redeeming a coupon or rebate and/or registering the product, for technical support or update reasons, the buyer must typically fill out a form, which they mail via post to the manufacturer. Upon receipt, the manufacturer will have to read the handwriting of the buyer to add the buyer's information from the form to their database. If the good purchased is software, only registration information may be gathered during installation. The buyer is still forced to interact with the manufacturer via post for coupons or rebates. The entire process fails if the buyer misplaces the receipt or the coupon or rebate or fails to file the same within a required timeframe. Upon receipt of such information, the manufacturer must determine whether or not to honor a coupon or rebate. To do so, they must determine whether the coupon or rebate applies to a specific good that has been sold to the specific buyer. Because this process if is difficult, it is not only time consuming, but is also subject to fraud. Such fraud may involve a purported buyer operating independently, a buyer and retailer operating together, or a retailer operating independently.

To combat fraud, manufacturers apply complicated approaches to attempt to link the coupon or rebate to the specific good, often confusing and disappointing buyers and retailers. For example, a fifteen digit model number may appear to correspond to a coupon being offered and causing a sale even though one digit may be off and only identified after a manufacturer's rejection has been received. If this happens to a retailer, the retailer may loose money on the sale of the item. If it happens to the buyer, the buyer may be angry with the retailer and/or the manufacturer and avoid their businesses in the future.

With large distributed channels, manufacturers typically do not know the identity of their retailers. This further complicates the rollout of coupon or rebate offering.

Many other problems and disadvantages associated with prior systems will become apparent to one of skill in the art upon review of such prior systems and in light of the teachings herein.

SUMMARY OF THE INVENTION

Various aspects of the present invention can be found in an online promotion system supporting buyers, sellers and promoters. Generally, a first party, such as a seller, offers one or more items online for sale, each item having a sales price amount. A promotion of a second party is associated with at least one of the sales items. A purchase request from a buyer for the item being offered online is received. In response, a buyer is required to pay a purchase amount corresponding to the sales price amount less the promotion amount for the item. The second party electronically pays to the first party an amount corresponding to the promotion amount. Then, the first party fulfills the purchase request after receiving an amount corresponding to the purchase amount and the payment amount. Such promotions may involve, for example, coupon or rebate functionality or both.

In other embodiments, in addition to (or instead of) promotions involving a decrease in a sales price as experienced by a buyer, a promotional system in accordance with the present invention processes promotions offering alternate value, such as an offering of additional or different goods or services for free or at a discount rate in exchange for one or more purchases of an item. For example, a first party ("promoter") may offer one or more items online for sale. A promotion of a second party is associated with at least one of the sales items. A purchase request from a buyer for the item being offered online may be received. In response, the buyer is required to pay a purchase amount corresponding to the sales price amount for the item. Thereafter, the first party receives an indication that the payment occurred. In response, the first party delivers the promotion value to the buyer.

Many other aspects and variations of the promotion system of the present invention can be appreciated by one of skill in the art through review of the detailed description, corresponding drawings, and claims.

BRIEF DESCRIPTION OF THE DIAGRAMS

The numerous objects and advantages of the present invention may be better understood by those skilled in the art by reference to the accompanying figures in which.

DETAILED DESCRIPTION OF THE DIAGRAMS

Figure 1:
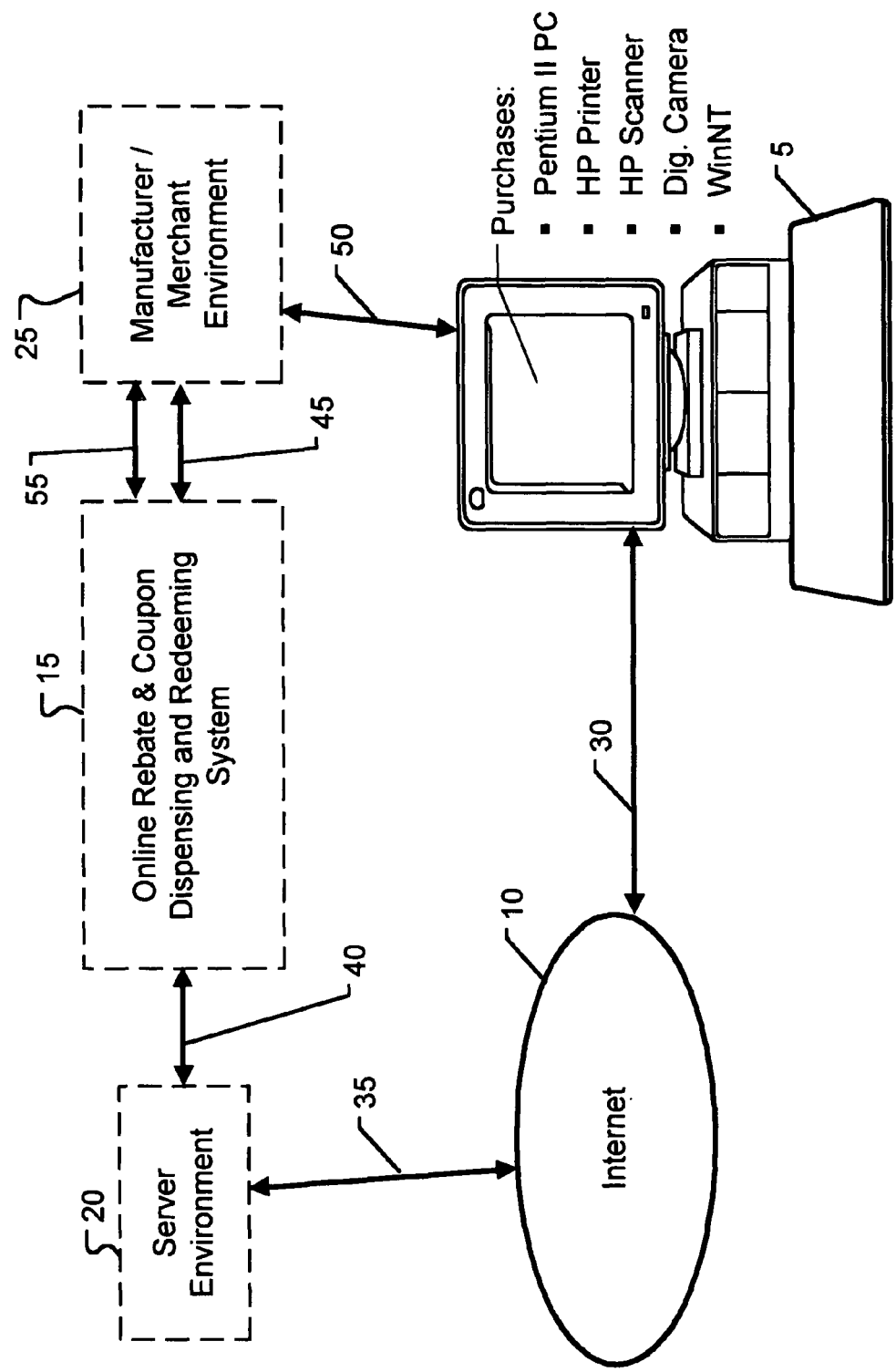
FIG. 1 is a perspective diagram of an online buyer using a computer, interacting with a system for online sales with automatic rebate and coupon redemption, via the Internet, to obtain savings from the automatic redemption of rebates and coupons that can apply towards his online purchases.

FIG. 1 is a perspective diagram of an online buyer using a computer 5, interacting with an online rebate and coupon dispensing and redeeming system 15, via the Internet 10, to obtain savings from the automatic redemption of rebates and coupons that can apply towards his online purchases. The system 15 is typically associated with a web server 20 that provides Internet-based web hosting services. In addition, the system 15 is linked via appropriate connections 45 to information systems at one or more manufacturer or merchant environments 25. Such information systems include appropriate Internet web hosting services.

The system 15 performs many functions. Among other functions, in many embodiments, the system 15: (1) verifies that a manufacturer's rebate or coupon applies to an independent retailer's offering; (2) instantly applies such rebates or coupons; (3) places control in the manufacturer for designing and defining the number, amount and, if desired, applicable timeframe of coupons or rebates in real time; (4) places control in the manufacturer for changing, replacing or canceling of coupons or rebates; and (5) supports advertising of rebates and coupons on many web servers by providing corresponding coupon and rebate processing. Thus, the system 15 automates the traditional human intensive coupon and rebate processing.

The system 15 supports automatic and manual adjustments of promotional offerings, i.e. coupons, rebates, etc. Automatic adjustments may be triggered by a variety of parameters such as the amounts of coupons and rebates distributed, the amount of coupons and rebates redeemed, current product inventory levels of the manufacturer or the distributor or retailer, the shelf life of products in inventory, etc. Adjustments may include increasing or decreasing the promotional value, i.e., the amount of the coupon or rebate, the quantity of coupons or rebates to be distributed, the term of the coupon or rebate, the goods to which the coupon or rebate may apply, or any other coupon or rebate parameter. The automatic adjustment parameters may be setup by the manufacturer, retailer, distributor, or system administrator via a web browser interface. Such interface may also be used to: modify such automatic adjustment parameters; change the coupon or rebate parameters; or withdraw the coupon or rebate.

Customers are presented with a catalog of products to choose from, by the web server 20 associated with the system for online sales with automatic rebate and coupon redemption 15, when they visit the system for online sales with automatic rebate and coupon redemption 15. If the customer selects one or more products from the catalog or list of products available at the system for online sales with automatic rebate and coupon redemption 15, they are provided with the option of purchasing the products with the automatic retrieval and application of rebates and coupons. They are also provided with the option of downloading them for purchasing those products at a future time.

If the customer elects to purchase the selected products from the system for online sales with automatic rebate and coupon redemption 15, all applicable rebates and coupons are applied to the customer's purchases by the system 15 in the determination of a final purchase price for the customer. The customer can consummate the purchase by using a credit card for payment. The system 15 processes customer's credit cards for sales processing.

Customer profiles, typically provided by customers during a customer profile generation activity, are selectively used by the system 15 to complete sales transactions and to ship products. Customer profile includes shipping address, credit card related information, etc. Once a customer profile is created, it is used to expedite subsequent customer purchases. Customers who choose not to have a profile created for them may be required to enter their shipping address, credit card related information, etc. during each purchasing activity.

In one embodiment of the present invention, a customer, using the computer 5 and the Internet connection 30, accesses one or more rebate and coupon dispensing web pages-presented by a server environment 20 associated with, and communicatively coupled with, the system for online sales with automatic rebate and coupon redemption 15. In this embodiment, the customer would retrieve one or more coupons and rebates for one or more products that the customer plans to purchase, by browsing through several categories of products presented by the system for online sales with automatic rebate and coupon redemption 15. The rebates and coupons for products are also located by searching for them via a searching interface. The customer then activates a purchase button to purchase the products. The system 15 completes a purchase order for the customer incorporating all the products selected by the customer and applying all applicable rebates and coupons. It also performs order fulfillment operations aimed at assigning products from its inventory to the customer.

In one embodiment, the inventory of some of the products purchasable from the system 15 are selectively maintained by the manufacturer/merchant environment 25. For such products, to perform order fulfillment activities, the system 15 interacts with the manufacturer/merchant environment 25, over the connection 45, in one of two approaches. In the first approach, the manufacturer/merchant environment 25 receives purchase orders to some products currently available in their inventory from the system for online sales with automatic rebate and coupon redemption 15, along with rebate and coupon information, in order to perform order fulfillment for the customer. The customer profile, or a subset thereof, is visible to the manufacturer/merchant environment 25 which then ships the products to the customer. In effect, the customer pays the manufacturer/merchant environment 25 directly for the products purchased from it.

In the second approach, the system 15 purchases the products using all associated coupons and rebates from the manufacturer/merchant environment 25 on behalf of the customer and has the purchased products shipped directly to the customer. In this scenario, the system 15 acts as a purchaser and pays for the products purchased from the manufacturer/merchant environment 25. It then bills the customer for the actual purchase price that incorporates relevant rebates and coupons. Thus, the customer benefits from the instantaneous redemption of coupons and rebates facilitated by the coupon dispensing and redemption system 15.

In one embodiment, the system 15 serves as a front end to the e-commerce sites of manufacturers and merchants wherein customers purchase products from the system 15 and reimburse it, say via credit cards, for the products purchased online. The system 15 in turn acquires the products purchased by the customer from designated suppliers such as manufacturers, distributors or retail merchants. A supplier is selected based on the product category, the inventories of products at the various suppliers, the business arrangements made with various suppliers and other criteria. In effect, the supplier sells the products to the system 15 which ensures the redemption of all available coupons and rebates for the purchases. The system 15 sells those products back to the customer passing most of the savings from rebates and coupons to the customer. The system 15 selectively charges the suppliers a transaction fee for generating their business. The customer is also selectively made to pay a service charge to the system 15 for its seamless and automatic rebate and coupon redemption.

In another embodiment of the present invention, the customer retrieves rebates and coupons from the system 15 and then saves these rebates and coupons, preferably in his browser software or on the hard disk of his computer 5. Such rebates and coupons are preferably saved in electronic form, for subsequent submission to the system for online sales with automatic rebate and coupon redemption 15, or to the manufacturer/merchant environment 25, during a purchasing activity. When presented with such coupons during any purchasing activity, the manufacturer/merchant environment 25 presents them, over the connection 45, to the system 15 for selective coupon and rebate authentication and selective redemption.

In another exemplary scenario, the online customer using the personal computer 5 accesses the Internet via a connection 30 employing a modem on his computer and a browser software on his computer. He then, using his browser software, navigates to a manufacturer/merchant environment 25, such as an electronic mall, to purchase one or more items of his choice. A connection 50 established over the Internet between the computer 5 and the manufacturer/merchant environment 25 allows user selection of purchasable items, optionally via a catalog of items presented to the customer by the manufacturer/merchant environment 25. After selecting the desired items into a shopping cart, the customer invokes a rebate and coupon button on a screen presented by the manufacturer/merchant environment 25 that results in the submission of the shopping cart to the system 15 via a connection 45. In response, the system 15 selectively returns all applicable coupons to each of the items in the customers shopping cart. This includes manufacturer's coupons, retailer's coupons, etc. In addition, if any items in the shopping cart are not specific enough to unambiguously identify a manufacturer, the system 15 returns coupons for multiple manufacturers of similar products for the customer to choose from. The returned rebates and coupons are automatically applied by the manufacturer/merchant environment 25 in the determination and display of a final price for the customer.

To submit online information on coupons to the system 15 so that they can be dispensed to customers, one or more manufacturer/merchant environments 25 employ a connection 55, which may be the Internet, and may be the same as the link 45 used by the manufacturer/merchant environment 25 to extract coupons on behalf of a customer from the system for online sales with automatic rebate and coupon redemption 15.

The system 15 selectively provides manufacturers and merchants information on the customer's region, the volume of sales, the material velocity of the products, etc., giving the manufacturer/merchant environment 25 the ability to change coupons based on their sales goals and other criteria.

Figure 2:
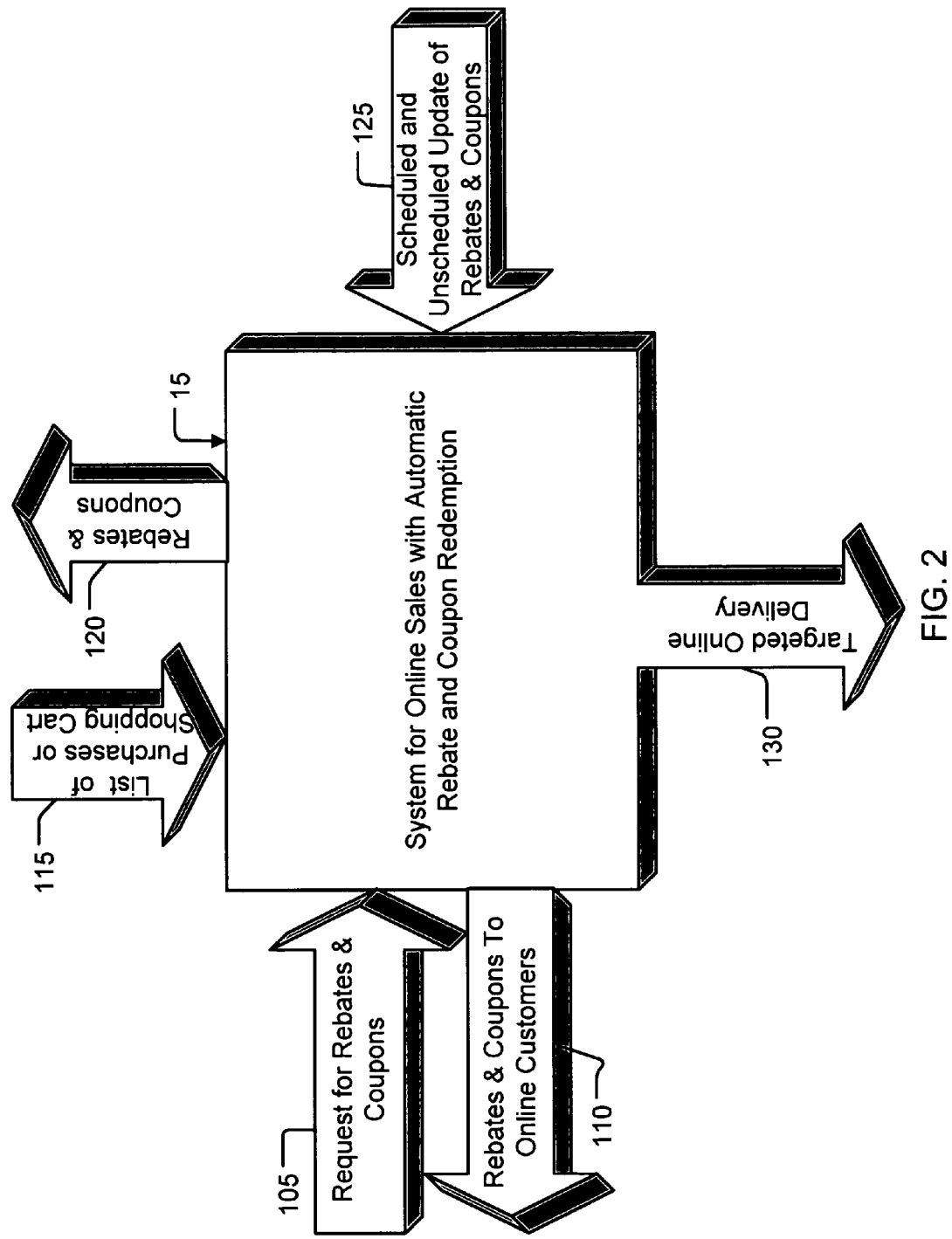
FIG. 2 is a diagram showing the various inputs and outputs of the system for online sales with automatic rebate and coupon redemption.

FIG. 2 is a diagram showing the various inputs and outputs of the system for online sales with automatic rebate and coupon redemption 15. The system 15 receives Request for Rebates and Coupons From Online Customers 105 and, in response, returns Rebates and Coupons To Online Customers 110. In addition, it receives a List of Purchases or Shopping Cart 115 from online merchants or online malls and, in response, it returns Rebates and Coupons 120. It also receives Scheduled and Unscheduled Update of Rebates and Coupons 125 from manufacturers and retailers. To automatically provide rebates and coupons to customers periodically, the system 15 performs Targeted Online Delivery 130, typically via email.

Figure 3:
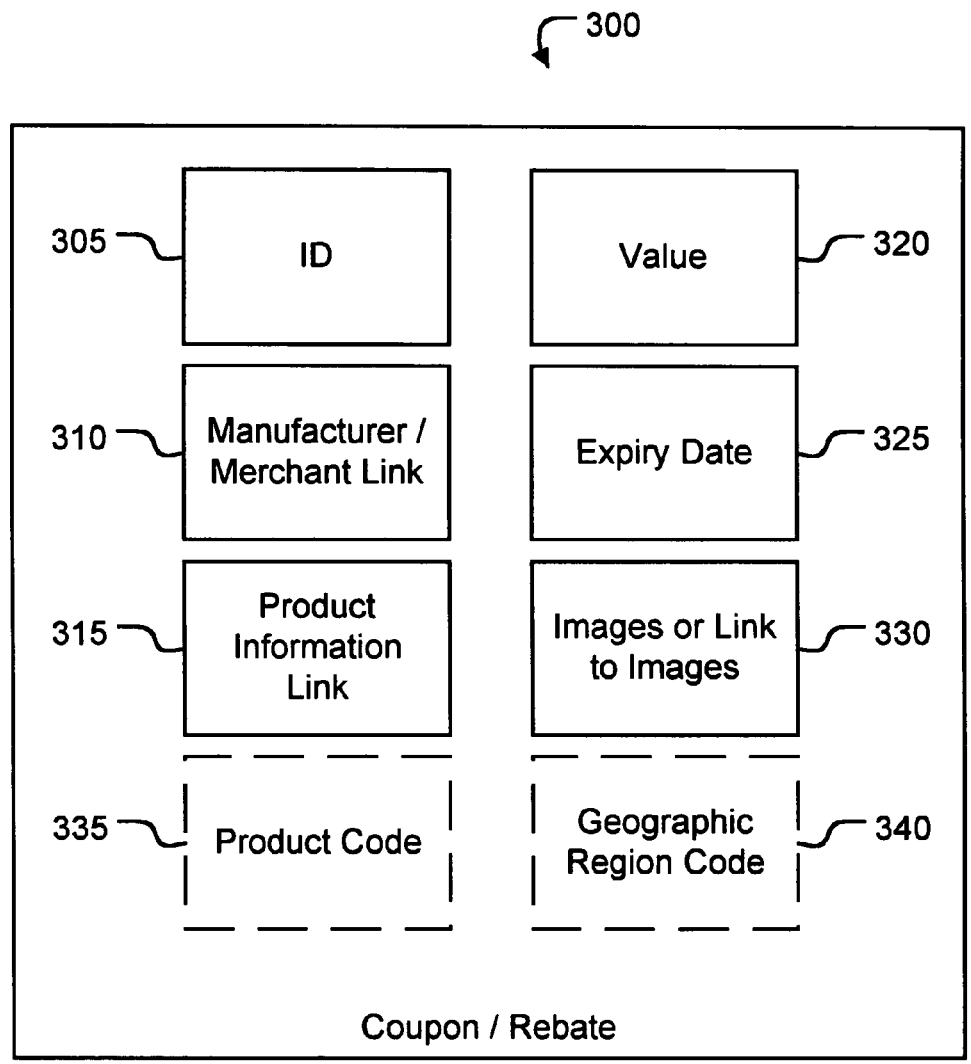
FIG. 3 shows the various elements contained in a rebate or a coupon in accordance with the present invention.

FIG. 3 shows the various elements contained in a rebate or a coupon in accordance with the present invention. The coupons 300 dispensed by the system 15 are each a structured collection of information including an identification 305, information on the value of the coupon 320, an expiry date 325, images or links to one or more images 330 for display purposes, links to a product manufacturer 310, and links to product information 315. Other information, such as a product code 335, a geographic region code 340, etc. may also be selectively included. Some of the information presented in a coupon may selectively be encrypted for subsequent decryption and/or display either by the software at a customer's computer 5 or at a manufacturer/merchant environment 25. In this embodiment, the coupon is presented as an HTML document with appropriate links to some of its elements as described above. The coupon may be stored in other document types also, as appropriate. Rebates are also structured similarly to coupons, and they typically contain all the elements described here for coupons.

In general, coupons and rebates dispensed by the system 15 may be selectively saved by customers for subsequent redemption. Saved coupons and rebates have an associated expiry date. The manufacturer/merchant environment 25 may choose not to honor coupons that have expired. In one embodiment of the present invention, the manufacturer/merchant environment 25 interacts with the system 15 to determine if an expired rebate or coupon should automatically be replaced by a newer one.

In another embodiment, the coupons and rebates being dispensed are generated in eXentisible Manipulation Language (XML) format. The customer's computer may or may not be able to process such XML documents. If, for example, the customer's browser cannot process the coupon information, then it does not display such information properly and gives the customer the option to save the coupon in the computer's 5 hard disk. Such XML coupons may not be processed by the manufacturer/merchant environment 25 if the information systems at their web site are not capable of processing XML based coupons. In such situations, the XML based coupons and other coupons that cannot be processed are returned to the system 15 by the manufacturer/merchant environment 25 for processing and for redemption.

Figure 4:
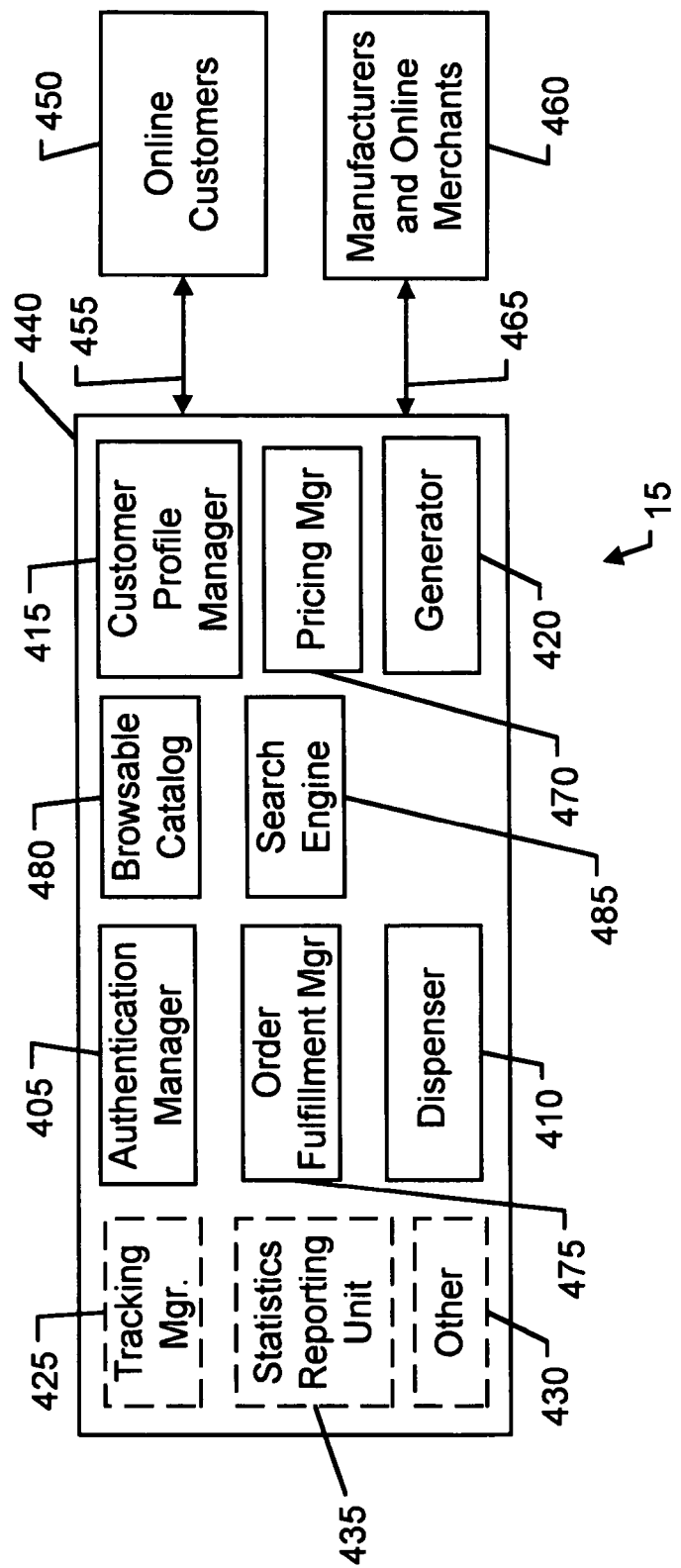
FIG. 4 is a block diagram showing exemplary components of the system for online sales with automatic rebate and coupon redemption.

FIG. 4 is a block diagram showing exemplary components of the system for online sales with automatic rebate and coupon redemption 15. The system 15 includes a browsable catalog 480 through which customers can select one or more products for purchasing, a search engine 485 for searching for specific products based on one or more criteria, an Authentication Manager 405 for verifying the authenticity of coupons and rebates presented to it for redemption, and a Dispenser 410 which dispenses coupons and rebates generated by a Generator 420. It also includes a Customer Profile Manager 415 which is used to gather profile information of customers and an optional Tracking Manager 425 that is used to track user buying patterns over a long term. An optional Statistics Reporting Unit 435 provides various statistical information to manufacturers and online merchants periodically or on-demand.

When customers decide to purchase products from the system for online sales with automatic rebate and coupon redemption 15, a pricing manager 470 provides pricing functionality that incorporates calculation of prices based on several factors including available rebates and coupons. The pricing manager 470 also includes a credit card processing unit that processes credit card based customer sales, and a sales support unit that provides quote generation features. An order fulfillment manager 475 provides information on available inventory of products. If a product purchased by a customer is not in stock or not stored locally at the system for online sales with automatic rebate and coupon redemption 15, the order fulfillment manager 475 makes it possible to purchase that product from the manufacturer, distributors or merchants. Such purchases are done in one of two ways—seamlessly where the customer does not realize that the product is being acquired from a manufacturer or merchant 460, or explicitly where the customer is aware of the participation of a manufacturer or merchant in the fulfillment of his purchase order.

Online Customers 450 access the system 15 over the connection 455. They can browse through the online browse-able catalog of products and services 480 or search for a specific product or service based on criteria such as product category, geographical region, brand names, etc. Manufacturers and Online Merchants 460 access the system 15 over the connection 465.

In one embodiment of the present invention, when providing access to customers who want to download coupons and rebates, the system 15 contains a browse-able indexed selection software making it easy for the customer to locate or search the required coupon or rebate. It also provides vectors to advertising placed by manufacturers or online merchants located either at the web server 20 or at an external web server. In addition, it can provide vectors to sales points such as online merchants or electronic malls where the associated products may be available for sale if it is not currently available for sale at the system for online sales with automatic rebate and coupon redemption 15. Moreover, the dispensed coupons and rebates can be automatically incorporated into the pricing logic of a merchant or manufacturer's electronic commerce system to which the system 15 provides links for customer access.

In a similar embodiment of the present invention, coupon verification is performed by the electronic commerce software of the manufacturer or online merchant to which a customer migrates to from the browse-able indexed coupon selection software, along with a coupon and/or rebate for one or more products. This implies that a customer can consummate a purchase of a product at a merchant or manufacturer's e-commerce site following the selection of a coupon or rebate from the system 15 and subsequent vectoring with a coupon and/or rebate to the e-commerce site.

The system 15 provides a circular path for identifying the users of dispensed coupons and rebates when coupons previously downloaded by customers are returned by online merchants or manufacturers for redemption. Thus, buying habits and patterns of coupon access of individual customers can be determined. Such information may be used in the generation of appropriate coupons for individual customers as well as for creating marketing plans by online merchants and manufacturers.

Downloaded coupons may be printed as bar-coded coupons by customers for subsequent redemption at traditional neighborhood merchant shops. The printing is facilitated by a print engine that is either available at the customer's computer or can be easily downloaded to the customer's computer. The same is true for coupons and rebates emailed to customers by the system 15 as part of a "targeted coupons dispensing activity" in which individual customers are targeted to receive appropriate coupons based upon their shopping behavior, as determined by the system for online sales with automatic rebate and coupon redemption 15. Automatic targeting of customers by the system 15 is based on customer's buying habits, current marketing promotions, etc., via for e.g. electronic mail (email). Customers have the ability to redeem them without having to print it them, as is typically done for purchases from online merchants.

In one embodiment, the system 15 provides credit to customers for coupons redeemed by the customers. It subsequently dispenses further coupons to those customers based on their credits earned. Such coupons may be used by the customers either for further online purchases or for purchases at a traditional store. In addition, coupons are obtained at a traditional neighborhood store redeemable during the customer's next online purchase. Such coupons are redeemed by customers during online purchases where they are provided with the opportunity to specify information about the coupons.

Coupons typically have an associated expiry date. Vendors assign expiry dates to not only the advertisements of products but also for their associated coupons. While browsing the web server 20 for products and coupons, when customers are presented with an advertisement, they are also presented with a coupon for it. A displayed advertisement vectors seamlessly, via a link, to an associated manufacturer's or merchant's online information website. If a customer activates such a link to an online merchant's e-commerce site, the coupon for the current product(s) is also automatically transferred to the online merchant's e-commerce site, if necessary, in order to facilitate the expected sale. Information carried by the coupon(s) may be employed by pricing and quote generation components of a merchant's e-commerce software.

In general, the system 15 integrates with sales force automation (SFA) software employed by manufacturers and merchants. It also integrates with e-commerce platforms that provide multi-vendor sales. For the multi-vendor platforms where similar products from multiple vendors are available for sale, the system 15 selectively dispenses "generic" coupons that will apply towards a product from any of the participating vendors. Such generic coupons may be provided to a customer along with a vendor-supplied coupon, if any.

In one embodiment of the present invention, information related to the geographical location of a customer is selectively used by system 15 in determining the type and/or value of coupon to dispense. For example, a manufacturer may desire to provide coupons of different value and expiry dates for the same product in different sales regions. The system 15 makes it possible to customize the different attributes of a coupon such as its value, expiry date, etc., to specific geographical zones or to specific user types. For example, a corporate customer may be provided a different coupon from those provided to non-corporate customers.

The system 15 optionally charges manufacturers and online merchants for its services. These charges may be levied by one of several different methods, some of them related to the number of customers who download coupons, some related to the number of customers who redeem those coupons, and others related to both these attributes. For example, local small businesses may provide a coupon and they are charged based on the number of coupons accessed or redeemed.

The system 15 captures the list of people who access it and download coupons. The local small businesses that employ the services of the system 15 pay a charge based on such a list. They can also update their coupons automatically via an interface to the coupon generation component of the system for online sales with automatic rebate and coupon redemption 15.

To facilitate location of a coupon for a product by a customer, in one embodiment, the system 15 provides a web interface where coupons are categorized into different product categories and a customer browses, using a web browser, through categories and sub-categories of products to locate one or more coupons. The system 15 also categorizes coupons by manufacturers and merchants. If a customer purchases one or more products on the system for online sales with automatic rebate and coupon redemption 15, the rebates and coupons, if any, are automatically applied to the final price for the customer.

Internet portals, such as Yahoo, and Internet web services, such as Internet service providers (ISPs), can provide an automatic connection to the system for online sales with automatic rebate and coupon redemption 15, so as to provide their readers information on available coupons on one or more products associated with the currently displayed web page. Such coupon related links or information is displayed in one of the frames displayed on the customer's web browser. Alternatively, these portals can route web browsers automatically to the system 15 to retrieve associated coupons if necessary, say in a pop-up screen (or frame) automatically created by the currently visible web-page provided by the portal. Thus, readers of web content provided by web page hosts and portals can retrieve coupons while they browse product information.

To facilitate the creation of coupons by manufacturers and online merchants, the system 15 provides canned images and coupon frames based on category, that may be further customized by manufacturers and online merchants to suit their needs.

Customers search for coupons by category and region. In general, four types of coupons are supported, coupons from retailer, coupons from distributors, coupons from manufacturer, and coupons from managers of point of sale devices. Other types of coupons can be easily incorporated.

The online nature of the coupon system provided by system 15 makes it possible for merchants and manufacturers to devise a coupon based marketing and sales strategy where the expiry date, and the volume of coupons in a marketing campaign are dynamically adjusted to meet goals. For example, current sales volume might determine changes to coupon's value and/or expiry date. It would be possible to stop coupons associated with a marketing campaign if sales targets are met. It would also be possible to yank out a coupon based marketing campaign if necessary.

The success of a rebate and/or coupon based marketing and sales campaign can be dynamically and frequently ascertained. Automatic reports on coupon distribution and the redemption rates of coupons are provided to the manufacturers and merchants by the system for online sales with automatic rebate and coupon redemption 15.

Identity of potential customers who access coupons and those who redeem them are maintained by the system for online sales with automatic rebate and coupon redemption 15. Such customer related information can later be used for mass mailing/distribution of coupons. Manufacturers and merchants provide information on their mass mailing needs and system 15 mails (or emails) coupons based on those needs and on online customer information collected automatically. Once coupons are mailed to potential customers, they are tracked to see if they are ever redeemed. Tracking of mailed coupons provides information related to the efficacy of sales and marketing strategy employed.

If a new product is being released by a manufacturer, the system 15 is used to setup, manage and monitor promotional activities based on coupons and/or rebates. The time frame for such promotional activities, the number of coupons and/or rebates to be dispensed, the duration and time frame for the promotional activities, etc., are set by the manufacturer using the promotional server 505. The manufacturer may modify the parameters of the coupons and/or rebates (such as coupon or rebate amount, the quantity, the duration, the applicable products, etc.) based on a preset threshold quantity of dispensed coupons or rebates, based on monitored sales activities, etc.

The system 15 can be used to adaptively move inventory by managing the amount and quantity of rebates and coupons. Therefore, the system 15 incorporates inventory tracking, coupon and rebate amount management, marketing activities, sales tracking and other business functions so as to make it possible to not only create promotional material but also to manage/modify the promotional activities based on buyer response to such promotional activities.

The system 15 makes it possible to integrate coupon delivery with software registration and product surveys. Customers who buy and install software are often reluctant to register them with the vendor. This situation is true for other types of products too. In order to provide an incentive for registration of products, the manufacturers or vendors of such products can integrate the system 15 with the registration process so that customers might be enticed with coupons for their next purchase.

An advantage of incorporating a coupon authenticator component in the system 15 is the ability to verify if a coupon has already been redeemed. This makes it possible to enforce a redemption rule of one coupon per customer. Copies of a redeemed coupon are disallowed, if necessary. Customers can be informed when a coupon is being reused. For example, they can be told to get newer ones rather than use old ones.

In one embodiment, coupons or rebates that have expired are automatically exchanged with newer ones. If necessary, a 24-hour grace period may be permitted for redemption of coupons to account for time zones too.

Figure 5:
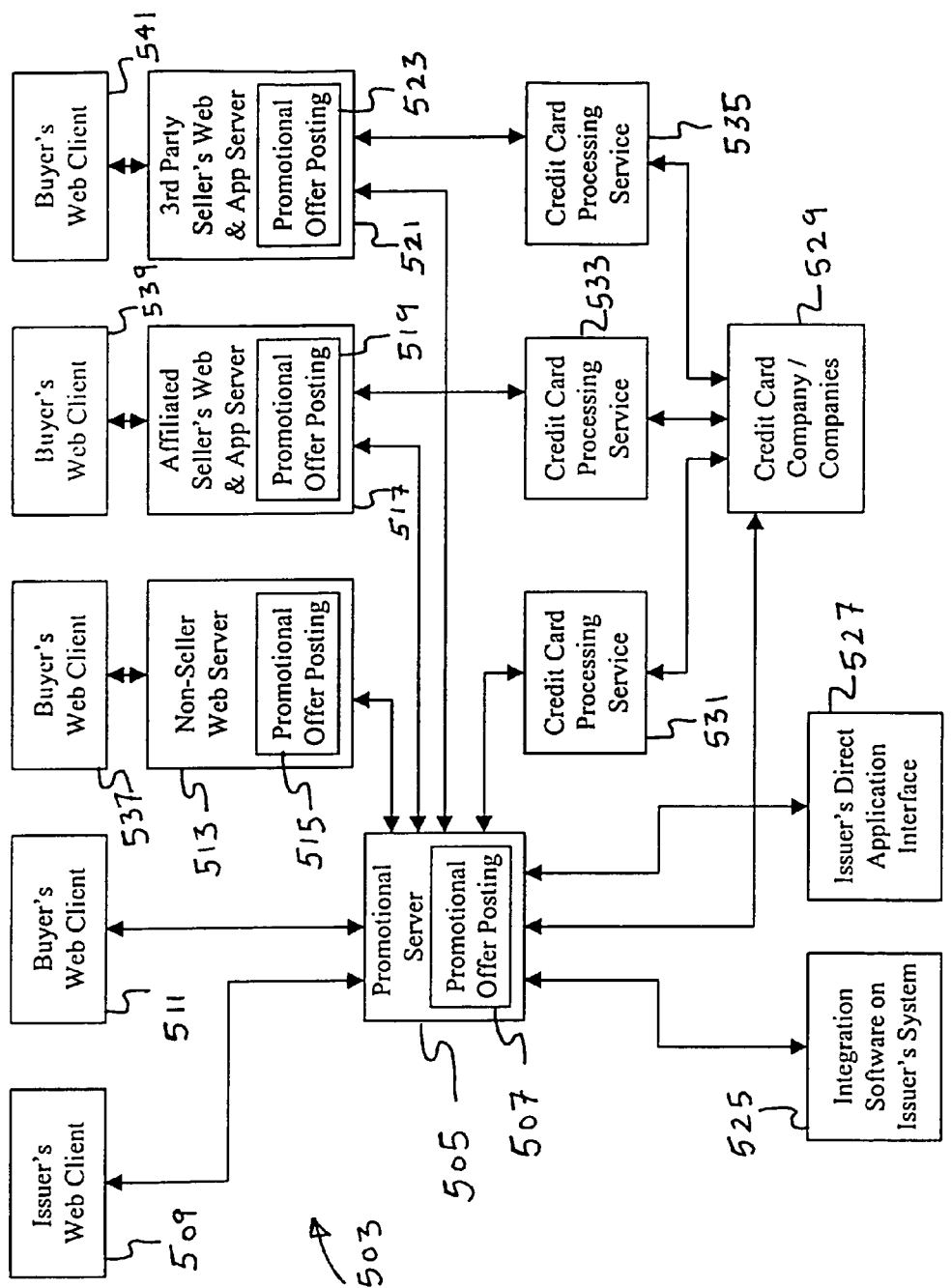
FIG. 5 is a perspective diagram of an online sales environment having a promotional server that interacts with online seller or non-seller, buyer, and issuer systems for offering promotional services.

FIG. 5 is a perspective diagram of an online sales environment 503 comprising a promotional server 505 that facilitates: management of promotional material by manufacturers, retailers and distributors via an issuer's web client 509; participation in online promotional sales by non-seller web servers 513, affiliated seller's web and application server 517 and 3$^{rd}$ party seller's web and application server 521; integration of credit card companies 529; and registration by buyers via buyer's web client 511. The promotional server 505 is selectively used by issuers of promotional material such as coupons, rebates, etc.: to create and manage promotional material (in real time or in non-real time) that are applicable to online and offline sales; to provide an online coupon and rebate redemption service that is integrated with their own online sales systems or with an online sales system managed by any other third parties; and to collect/retrieve information related to online sales and the efficacy of their online promotions.

Online buyers register with the promotional server 505, via buyer's web client 511, in order to: automatically register products purchased online with the manufacturers, for warranties and other services, with the help of the promotional server 505; receive refunds due to the buyer from the application of coupons and/or rebates to online purchases consummated by buyer on 3$^{rd}$ party seller's web and application server 521; and to receive information on product information, sales, discounts, product recall, etc. via email or by other mechanisms.

The promotional server 505 hosts promotional offer posting from a plurality of issuers. The issuers may be manufacturers of goods, providers of services, distributors of manufactured goods, online retailers, etc. The promotional offer postings hosted by the promotional server 505 are coupons, rebates, etc. Promotional offer postings are governed by parameters such as the manufacturer, the associated product, the monetary amount of the promotional offer, the quantity of the promotional offer, the time frame, and any other parameters that may govern promotions. The issuers have the ability to manipulate these parameters using the issuer's web client 509. They also have the ability to create promotional offer postings 507, manage them and manipulate the associated parameters via an issuer's direct application interface 527.

In one embodiment, the promotional offer posting 507 comprises a portal that lists a plurality of promotions such as coupons, rebates, etc. The promotions are categorized based on types of goods and services being sold through the various seller's web servers. A search engine is also provided to assist in locating specific promotions from the plurality. For example, the buyer through the web client 511 might browse to find the available coupons and rebates for a hand held computer under the general category of computer systems. Alternatively, the buyer might enter the terms "hand-held computer" to direct a search through all of the plurality of promotions to find promotions matching such terms.

This search engine may also be used to supplement other search engines of sellers, portals, etc. For example, on a first search engine, a buyer may enter search terms which are used to search a corresponding database for information, goods or services that are offered for sale. Such search terms are also used by the promotional server 505 to search the plurality of promotions stored therein. Alternatively, the plurality of promotions may also be stored in/along with the first search engine for searching through the first search engine.

Typically, promotional offer postings are visually presented to all users that invoke an associated "promotional element" on a web page provided by non-seller web servers 513, affiliated seller's web and application server 517 and 3$^{rd}$ party seller's web and application server 521. However, some promotional offer postings are selectively provided based on criteria specified by issuers. Such criteria may include the number of past purchases of the same or similar products by individual buyers, the random selection of recipients of specific promotional material by non-seller web servers 513, affiliated seller's web and application server 517 and 3$^{rd}$ party seller's web or application server 521, etc.

Buyers have the option of registering with the promotional server 505 over the Internet using the buyer's web client 511. During such online registration process, the buyer provides personal information and credit card information that are stored by the promotional server 505. The buyer's personal information is selectively used by the promotional server 505 to: register products subsequently purchased by the buyer with the associated manufacturer; inform the buyer about product recalls, etc; selectively forward promotional material to the buyer via email; selectively enhance the value of promotional offer postings to specific buyers or to specific category of buyers; etc.

In general, the promotional server 505 employs several different processes to participate in the consummation of online sales, depending upon the nature of integration of the services offered by the promotional server 505 with the services offered by other online sales systems such as the non-seller web servers 513, affiliated seller's web and application server 517 and $3^{rd}$ party seller's web and application server 521. The specific process employed by the promotional server 505 also determines the approach by which a buyer redeems the amount associated with a coupon or rebate. For example, in one embodiment, if the buyer consummates an online purchase at the affiliated seller's web and application server 517, the promotional server 505: reimburses the affiliated seller's web and application server 517 or its associated merchant account, either immediately or in deferred mode, for the amount of the coupon or rebate exercised by the buyer towards the buyer's purchase; conducts transactions with the issuer(s) of the coupon(s) or rebate(s), in real time or in deferred mode, to redeem the amount of the associated coupons or rebates; selectively charges the issuers (such as manufacturers providing rebates) for services rendered (such as those rendered during the buyer's transactions); selectively registers products with associated manufacturers for tech support and warranty purposes; and selectively updates buyer's profile, if necessary, with the purchase related information.

The affiliated seller's web and application server 517 is more tightly integrated with the promotional server 505 than is the $3^{rd}$ party seller's web and application server 521. This makes it possible for the promotional server 505 to interact in more than one way with the affiliated seller's web and application server 517 in completing a buyer's online purchases. For example, in one embodiment, the affiliated seller's web and application server 517 charges the buyer only for the actual purchase price taking into account any and all rebates or coupons that may apply towards the buyers purchases, and in turn conducts a transaction with the promotional server 505 to recover the amount of coupon or rebate that is not charged to the customer. The promotional server later interacts with one or more associated issuers to recover the cost of the coupons or rebates redeemed by the buyer. Such interaction is selectively conducted in online interactive mode with issuers or in a batch or deferred mode.

In another embodiment, the affiliated seller's web and application server 517 charges the buyer only for the actual purchase price taking into account any and all rebates or coupons that may apply towards the buyers purchases and recover the such amounts associated with the applied coupons and rebates later from the promotional server 505 by billing the promotional server for those amounts. In a variant of this approach, the affiliated seller's web and application server 517 informs the promotional server 505 of all rebates and coupons redeemed by its online buyers and the promotional server 505 deposits money, such as via electronic fund transfers, to any bank account associated or managed by the affiliated seller's web and application server 517.

In another embodiment, the affiliated seller's web and application server 517 retrieves a registered user's profile from the promotional server to present the buyer, using the buyer's web client 539, with a set of coupons and rebates tailored to the buyer's interest based on the buyer's profile.

The non-seller web server 513 typically carries promotional offer posting 515 that typically provides a vector to associated web pages hosted by the promotional server 505. By activating the promotional offer posting 515 on web pages provided by the non-seller web server 513, the buyer can migrate to online sales related web pages provided by the promotional server 505 and purchase associated products, while also availing of and/or coupons associated with the purchased product(s). In completing the online sales transaction with the buyer, the promotional server 505: prompts the buyer for credit-card information and shipping information if the buyer is not a registered buyer; retrieves coupon or rebate amount for the product(s) selected by buyer; applies all coupons and rebates retrieved for the purchased products; selectively interacts with a credit card processing service 531 or credit card company 529 in order to process buyer's credit card information; selectively interacts with the issuer of associated promotional offer posting to inform issuer of sales related information; and selectively interacts with the issuer to charge the issuer for services provided during the sale.

The $3^{rd}$ party seller's web and application server 521, although not as integrated with the services provided by the promotional server 505 as the affiliated seller's web and application server 517, interacts with the promotional server 505 to inform the promotional server details of the buyer's online purchases, such as the identification and quantity of the products purchased by the buyer along with buyer information such as the buyer's address or bank account, while charging the buyer for the full amount for the products purchased without immediately applying the coupons and rebates, if any. The promotional server 505 later sends a check to the buyer via post or transfers money to the buyer's bank account or credit card account if such buyer information is provided by the $3^{rd}$ party seller's web and application server 521.

In one embodiment, the interaction between the promotional server 505 and the issuer's is in real time. Such interaction is typically facilitated by integration software on the issuer's system 525. The promotional server 505 conducts transactions with the integration software on the issuer's system 525 to send information on redeemed coupons and/or rebates to the issuer and to achieve reimbursement for coupons and rebates honored by the promotional server 505.

In another embodiment, the promotional server 505 communicates a list of coupons and rebates honored by buyers to one or more issuers, and the issuers, in turn, transfer reimbursements associated with those redeemed coupons and rebates to the promotional server 505. Such reimbursements may be conducted employing money transfer into an established bank account or by other means such as electronic fund transfer, checks, etc. The communication between the promotional server 505 and the issuer's systems, such as the integration software on the issuer's system 525 or the issuer's direct application interface 527, regarding redeemed coupons and rebates may be conducted in interactive mode in real time, in non-interactive mode in real time, in batch mode in deferred mode, batch mode in real-time, etc.

In one embodiment, a buyer, using the buyer's web client 541, interacts with the $3^{rd}$ party seller's web and application server 521 to conduct online purchases. The $3^{rd}$ party seller's web and application server 521 charges the buyer the full amount on the purchased products including the amount on the rebates and coupons, if any rebates or coupons are associated with the purchased products, but displays the amount of coupons/rebates that will be reimbursed to them. Such charges are made to the credit card account provided by the buyer to the 3$^{rd}$ party seller's web and application server 521. The 3$^{rd}$ party seller's web and application server 521 then interacts with the promotional server 505 to communicate details of the online purchases made by the buyer and buyer information, including the buyer's credit card account information. The promotional server 505 then reimburses the buyer the total of all the coupons/rebates that apply to the buyer's purchases by conducting a transaction with the credit card processing service 531 or the credit card company/companies 529. Such reimbursement transactions with the credit card processing service 531 or the credit card company/companies 529 are selectively conducted in real-time or in deferred mode after batching one or more buyer redemptions.

In one embodiment, the 3$^{rd}$ party seller's web and application server 521 does not provide any indication of the completion of a buyer's online purchase to the promotional server 505. Instead, the promotional server 505 determines the completion of online purchase by the buyer from the 3$^{rd}$ party seller's web and application server 521 and determines the buyer information details and details of products purchased from sales completion document made available to the buyer from the 3$^{rd}$ party seller's web and application server 521. Such sales completion document may be an online purchase order provided to the buyer, or an online order tracking web page presented to the buyer. Other mechanisms for determining purchase order completion may be employed by the promotional server to determine the completion of online purchases by the buyer.

In one embodiment, manufacturers selectively use the promotional server as a mechanism for providing up-sell information to buyers when buyers, using buyer's web client 537, 539, 541, access promotional offer posting 515, 519, 523 located at non-seller web servers 513, affiliated seller's web and application server 517 and 3$^{rd}$ party seller's web and application server 521, respectively.

In another embodiment of the present invention, when a buyer, using one of buyer's web clients 537, 539, 541, accesses a specific promotional offer posting such as a coupon or rebate presented by the non-seller web servers 513, the affiliated seller's web and application server 517 or the 3$^{rd}$ party seller's web and application server 521, respectively, the buyer is presented with a list of promotional material for other products that the buyer is deemed to be interested in by the promotional server 505. Such a list of promotional material may include: promotional materials for other similar products by the same manufacturer; promotional materials that belong to the same category of products as the one the buyer initially evinced interest in; promotional materials for only those products that the associated manufacturer considers relevant to the buyer; promotional material for all competing or associated products from the same or different manufacturers; or promotional material determined to be useful to the buyer by the individual web servers 513, 517, 521.

In one embodiment, the buyer, using the affiliated seller's web and application server 517, the buyer can assemble a shopping cart of products that is presented and maintained by the affiliated seller's web and application server 517. The buyer can then request the affiliated seller's web and application server 517 to extract all applicable coupons and rebates to the shopping cart. The affiliated seller's web and application server 517 interacts with the promotional server 505 to extract all applicable coupons and rebates for the buyer's shopping cart. It then applies the extracted coupons and rebates to the shopping cart.

In another embodiment, the buyer, using the buyer's web client 537, assembles a shopping cart with online products at a different online sales web server than the affiliated seller's web and application server 517 and then transfers the shopping cart to the promotional server 505 to extract all applicable coupons and rebates. The transfer of the shopping cart by the buyer to the promotional server 505 is implemented in one of several ways: by the transfer of an XML file to the promotional server 505 via an HTTP connection to the promotional server 505; by uploading shopping cart information stored in a file or in memory at the client computer to the promotional server 505 via upload web pages provided by the promotional server; by sending a shopping cart in an email to the promotional server, the shopping cart represented as an XML document or as some other structured document; or by other common techniques to transfer a shopping cart to the promotional server 505. A buyer may choose to retrieve applicable coupons and rebates based on their current shopping cart contents by interacting with the promotional server 505 via the affiliated seller's web and application server 517 or via the 3$^{rd}$ party seller's web and application server 521. In both cases, the promotional server facilitates the automatic redemption of rebates and coupons that can apply towards the buyer's online purchases. In some embodiments, the buyer is unaware of the promotional server 505 and presumes the automatic redemption of rebates and coupons to be provided by the web server that the buyer conducts his purchases from.

In a multi-functional embodiment of FIG. 5, the promotional server 505 supports multiple processing approaches for facilitating promotion redemption. When a buyer attempts to purchase a good or service on a 3rd party sellers web and application server 521, the 3rd party sellers web and application server 521 receives full payment for the good or service offered. If the buyer's account supports charge-back, then the promotional server 505 will charge-back the promotional amount to the buyer's account after the buyer has completed the purchase for the entire sales price. Otherwise, the promotional server 505 will pay the 3rd party sellers web and application server 521 the full sales price itself and charge the buyer's account for the sales price less the promotional amount. In either case, the promotional server 505 will charge the issuer's account for the promotional amount.

Service charges can be applied to the issuer, or the issuer's account, buyer's account, and/or to the 3rd party seller's web and application server 521. Such surcharge (service charges) can be used to collect value for services rendered by the promotional server 505. In addition, the issuer and/or the buyer may pay more than the promotional amount and/or sales price less the promotional amount, respectively, as an incentive to the buyer and/or the seller.

In such interaction, the 3rd party seller's web and application server 521 need not be aware of the issuer's promotion amount. Even if aware, the 3rd party sellers web and application server 521 need not account for the promotion amount of the issuer in the offering price of the item. In either case, however, the promotional server 505 identifies when the transaction for the promoted item has been completed.

Similarly, a buyer interacts through the promotional server 505 and the affiliated seller's web and application server 517 to purchase a good and exercise a promotion. This is accomplished by making two account transactions with the affiliated seller's web and application server 517. Specifically, the buyer's account is used to pay the sales price less the promotion amount, while the issuer's account is used to pay the promotion amount.

The promotional server 505 also supports full payment of the sales price of an item by the issuer's account. When so charged, the promotional server 505 will assist in the payment from the buyer's account to the issuer for the purchase price less the promotion amount. Of course surcharges and incentives might also be applied in such transactions.

The buyer's account may comprise an account such as a credit card or bank account that is independent of the promotional server. Alternatively, the buyer's account may be a credit or deposit account managed directly by the promotional server. Similarly, the issuer's account might be a credit or deposit account managed directly by the promotional server. Promotional server may bill an issuer's and/or buyer's account on a monthly basis or charge the issuer's and/or buyer's account immediately.

The promotional server 505 can perform credit or account processing directly through the processing service 531 or allow such processing to be performed by the servers 517 and 521 via the corresponding services 533 and 535.

In another embodiment, the promotional server 505 constructs a promotional offer posting 507 from a plurality of issuers of promotions and corresponding sales information retrieved from a seller or the seller's web and application server. A buyer browses (by category) or searches the sales information in the promotional offer posting 507 to identify an item for purchasing. Upon receiving a purchase request for such item from the buyer, the promotional server 505 charges the buyer's account for the sales price less the promotion amount, then uses the promotional server's account (which may be setup by the issuer or through contributions from the issuer, for example) to pay the full sales price directly to the seller. Although, tighter integration may be used, the promotional server 505 need only deliver it's account information, buyer's shipping information and the sales item(s) information to the non-integrated seller's online sales system. The seller's system need not distinguish this interaction with traditional online sales interaction with a buyer without promotions.

Figure 6:
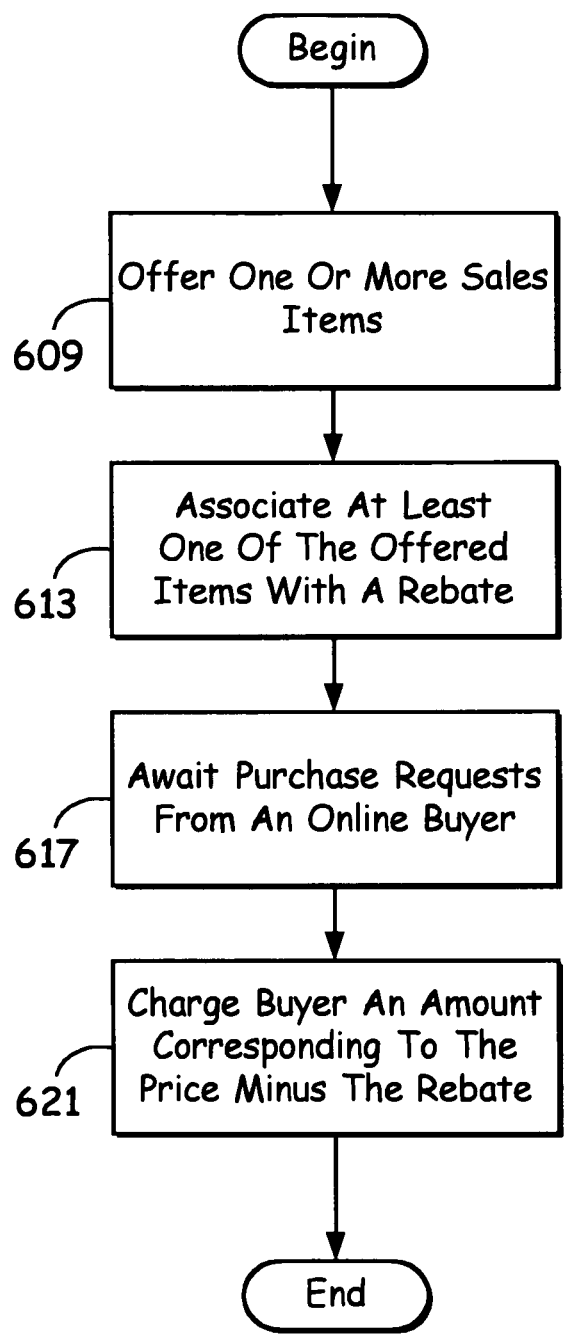
FIG. 6 is a flow diagram illustrating rebate processing functionality of one embodiment of the present invention.

FIG. 6 is a flow diagram illustrating rebate processing functionality of one embodiment of the present invention. Specifically, at a block 609, a seller offers an item online for sale at a sales price amount. At a block 613, a manufacturer's rebate having a rebate amount is associated with the item. A purchase request from a buyer for the item being offered online is received at a block 617. In response, at a block 621, a buyer is required to pay a purchase amount corresponding to the sales price amount less the rebate amount for the item.

Of course there are many variations and further processing functionality that may be applied to this process. For example, the purchase amount may comprise the sales price amount less the rebate amount, and may further comprise a service charge amount. The purchase amount may also comprise an amount lower than the sales price amount, and greater than the sales price amount less the rebate amount.

The manufacturer may also control the rebate. This may involve adjusting a rebate parameter or canceling the rebate. Rebate parameters may include, for example, a rebate amount, quantity of rebates offered, rebate offering time frame, rebate terms and conditions, goods or services associated with the rebate, particular sellers to which the rebate applies, manufacturer and/or distributors involved, the issuer, automatic thresholds and conditions under which other rebate parameters will change, passwords and other account information regarding the issuer or other parties involved, etc.

In certain embodiments, associated with the block 621, the purchase amount is electronically collected by the seller. The purchase amount may comprise the sales price amount less the rebate amount plus a service charge amount. Similarly, the manufacturer may be electronically charged at least the rebate amount, which may consist of the rebate amount plus a service charge amount. At least a portion of the service charge amount, if not all, may be distributed to the seller. Similarly, at least a portion of the service charge amount, if not all, may be distributed to a promotional system for services rendered.

An account of the buyer is charged the purchase amount in the block 621, in some embodiments. At least a portion of the charged amount may be directly delivering to the seller. In such configurations, the charging may be performed via a promotional system. Alternatively, the buyer's account may be charged an amount corresponding to the sales price amount and credited an amount corresponding to the rebate amount. The purchase amount may include a service charge amount that is also charged to the buyer's account. In various embodiments, the buyer interacts online to cause payment to the seller of the sales price amount less the rebate amount, and the manufacturer electronically pays the rebate amount to the seller. A manufacturer's account may be used for paying at least the rebate amount. The manufacturer's account may be established in association with a promotional system or independently. Such payments may be performed directly or via a promotional system.

In Internet applications, a web server may be used to deliver the manufacturer's rebate to a browser of the buyer. The manufacturer's rebate may comprise one of a plurality of manufacturer's rebates delivered by the web server. The web server may operate as at least a part of a promotional system, a seller's system, an affiliate's system or a third party's system. In any case, the system may comprise a rebate system offering or supporting only promotional items for sale.

Other extensions of the present invention involve the selection of a potential buyer and delivering a manufacturer's rebate to the selected buyer. Among other traditional delivery infrastructures, delivery may be performed via email. Selection of the potential buyer may be based the previous purchase history of the selected buyer and/or registration information. The manufacturer through human interaction may make such selection with information regarding each potential buyer, or automatically pursuant to a manufacturer's defined set of filtering criteria. More than one manufacturer's rebate may be sent to the selected buyer.

The present invention also supports shopping cart interaction. Shopping carts, or logical equivalents thereof, may contain the item for sale and at least one other item for sale. The promotional system may identify the item in the shopping cart. After identifying the sales item, the purchase request may be responded to.

A visual rebate element may be displayed for a buyer. The element will typically contain at least one of the plurality of rebate parameters. The visual rebate element can be involved in the association of the rebate with the item for sale. Third party systems may offer for a buyer's selection one or more visual rebate elements. The elements may also direct the buyer to an item for sale on a sales system of the seller. Visual rebate elements can be banner ads or other advertisements, for example. Visual rebate elements may also direct the buyer to other of the plurality of rebate parameters.

In some implementations, the seller will not fulfill a purchase request without receiving an amount corresponding to the purchase amount and the rebate amount. The language "corresponding to" (as used herein and throughout the application) attempts to clarify that any such amount need not be exact. For example, a seller may fulfill the purchase request by receiving the purchase amount plus the rebate amount but less or plus a surcharge (e.g., for service rendered). Such surcharge may be applied through the payment of the purchase amount, the rebate amount, both the purchase and the rebate amounts, or along with both amounts if the charges are paid to the seller in one transaction, etc. Therefore, the use of the language "corresponding to" anticipates that the exact amounts need not be paid to accomplish the payment purpose.

Figure 7:
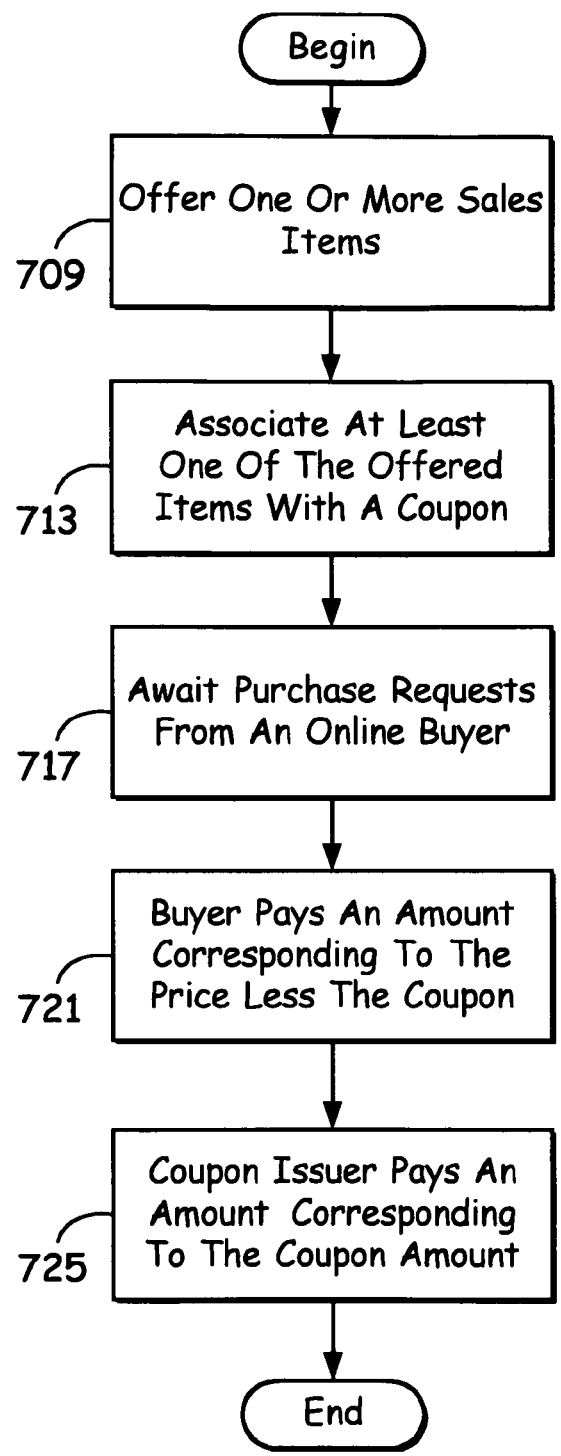
FIG. 7 is a flow diagram illustrating coupon processing functionality of another embodiment of the present invention.

FIG. 7 is a flow diagram illustrating coupon processing functionality of another embodiment of the present invention. Such processing may operate independently of rebate processing or may operate together in a single system along with other promotional functionality. At a block 709, a first party, such as a seller, offers one or more items online for sale, each item having a sales price amount. A coupon of a second party is associated with at least one of the sales items at a block 713. A purchase request from a buyer for the item being offered online is received at a block 717. In response, a buyer is required to pay a purchase amount corresponding to the sales price amount less the coupon amount for the item, at a block 721. At a block 725, the second party electronically pays to the first party an amount corresponding to the coupon amount.

As with the rebate processing functionality, there are many variations and further functionality that may be applied to such coupon processing. In fact, the aforementioned variations and further functionality of the rebate processing described with reference to FIG. 6 can be applied to the coupon embodiment of FIG. 7. For example, the purchase amount may comprise the sales price amount less the rebate amount and include a service charge amount, either party may control the coupon and coupon parameters (which parallel that of rebates), payments of the purchase amount and coupon amounts may be electronically made to the first party, buyer and third party accounts may be used, etc. Similarly, in Internet applications, a web server may be used to deliver a coupon from one or more coupons stored on the web server to a buyer's browser. The web server may operate as at least a part of a promotional system, a first party's system, a second party's system, an affiliate's system or a third party's system. In any case, the system may comprise a system supporting coupon processing alone or in combination with other promotional activities such as rebates. Many other extensions of the present invention as applied to coupon processing can be found above in relation to the processing of rebates as described above with reference to FIG. 6.

Figure 8:
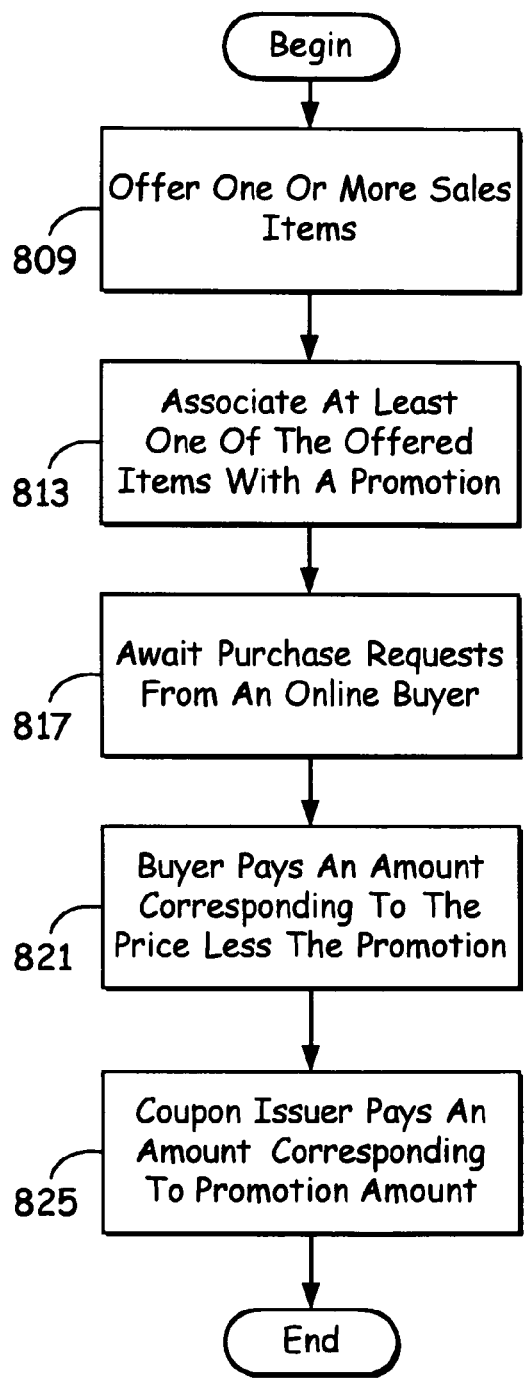
FIG. 8 is a flow diagram illustrating the application of various aspects of the present invention to any promotional processing functionality including that of rebate and coupon processing.

FIG. 8 is a flow diagram illustrating the application of various aspects of the present invention to any promotional processing functionality including that of rebate and coupon processing. Generally, at a block 809, a first party, such as a seller, offers one or more items online for sale, each item having a sales price amount. A promotion of a second party is associated with at least one of the sales items at a block 813. A purchase request from a buyer for the item being offered online is received at a block 817. In response, a buyer is required to pay a purchase amount corresponding to the sales price amount less the promotion amount for the item, at a block 821. At a block 825, the second party electronically pays to the first party an amount corresponding to the promotion amount. Then, at a block 825, the first party fulfills the purchase request after receiving an amount corresponding to the purchase amount and the payment amount.

As with the rebate and coupon systems (which constitute promotional systems) described in reference to FIGS. 6 and 7, respectively the aforementioned variations and further functionality can be applied to the general case, the promotional embodiment of FIG. 8.

Figure 9:
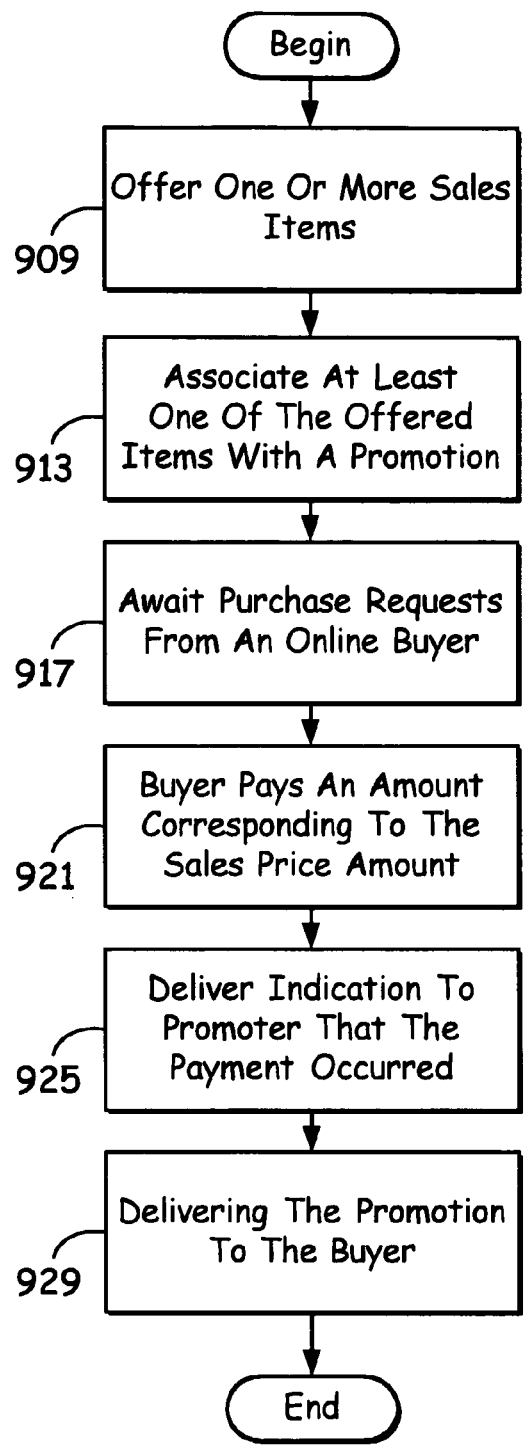
FIG. 9 is a flow diagram illustrating the application of various aspects of the present invention to any promotional processing wherein the promotion may involve more that a discount off a purchase price.

FIG. 9 is a flow diagram illustrating the application of various aspects of the present invention to any promotional processing wherein the promotion may involve more than a discount off a purchase price. In particular, at a block 909, a first party (a "promoter") offers one or more items online for sale. A promotion of a second party is associated with at least one of the sales items at a block 913. A purchase request from a buyer for the item being offered online is received at a block 917. In response, a buyer is required to pay a purchase amount corresponding to the sales price amount for the item, at a block 921. Thereafter, at a block 925, the first party receives an indication that the payment occurred. At a block 929, the first party delivers the promotion value to the buyer.

In some embodiments, the delivery of the promotion value will only occur after at least one promotion condition has been met. For example, the promotion condition may require that several of the items offered for sale is be purchased, and/or such items be purchased simultaneously or within a fixed time period. Many other types of promotion conditions may be applied which parallel traditional promotional techniques.

Nearly all of the aforementioned variations and further functionality described with reference to FIGS. 6-8 apply to the present embodiment illustrated in FIG. 9. Further, the functionality of FIGS. 6-9 may be combined into a single system to support all types of promotions with both price discounting and non-price value offerings.

With reference to the above-described figures, a method of processing a manufacturer's rebate may comprise, for example, the following. A manufacturer associates a rebate with an item, where the rebate has a rebate amount. A seller offers the item online for sale at a sales price amount that does not account for the rebate of the manufacturer. A purchase request for the item being offered online is received from a buyer. The purchase request is then responded to by requiring the buyer to only pay a purchase amount corresponding to the sales price amount less the rebate amount for the item.

The purchase amount may be, for example, the sales price amount less the rebate amount. In addition, the purchase amount may also include a service charge amount. The purchase amount may alternatively be, for example, an amount lower than the sales price amount, but greater than the sales price amount less the rebate amount.

In one embodiment, the manufacturer may control the rebate. For example, the rebate amount or a parameter of the rebate may be adjusted, or the rebate may be disassociated from the item for sale altogether.

The seller may also electronically collect the purchase amount, which again may be, for example, the sales price amount less the rebate amount plus a service charge amount.

In addition, the manufacturer may be electronically charged at least the rebate amount, which may comprise, for example, the rebate amount plus a service charge amount. A portion of the service charge amount may further be provided to the seller. Also, at least a portion of the service charge amount may be provided for services rendered by a promotion system.

In one embodiment, an account of the buyer is charged for the purchase amount. In this case, at least a portion of the charged amount may also be provided to the seller. The charging of the buyer's account may be performed, for example, via a promotion system.

When the buyer's account is charged an amount corresponding to the sales price amount less the rebate amount, the account may also be credited for an amount corresponding to the rebate amount. In addition, when the purchase amount includes a service charge amount, the buyer's account may additionally be charged for the service charge amount.

In one embodiment, the buyer may interact online to cause payment to the seller of an amount corresponding the sales price amount less the rebate amount. The manufacturer may then electronically pay the rebate amount to the seller. Such paying may be performed directly or via a promotional system.

In one embodiment, an account may be established for the manufacturer for paying at least the rebate amount. Such payment may be assisted by a promotion system. The account established for the manufacturer may be associated with the promotional system or be independent of the promotion system.

The method may also comprise delivering, by a web server, the rebate to a browser of the buyer. Such rebate may be one of a plurality of rebates delivered by the web server. The web server may be that of a promotion system or a system of the seller. When it is a system of the seller, the system may be an affiliate system, a non-seller system or a rebate system offering only promotional items for sale. In fact, in either case, the system may be a rebate type system offering only promotional items.

The method may also comprise selecting a potential buyer, and delivering the rebate to the selected buyer. Such delivery may be performed, for example, via email. The selection may be, for example, based on a previous purchase history of the selected buyer or on a registration of the selected buyer. The manufacturer, for example, may perform the selection.

The method may further comprise delivering the rebate to a selected buyer with at least one other of the manufacturer's rebates. Also, a shopping cart containing the item for sale and at least one other item for sale may be constructed. A promotion system, for example, may identify the item in the shopping cart, and the response to the purchase request occurs after the item is identified.

In one embodiment, the rebate comprises a plurality of rebate parameters. At least one of the plurality of rebate parameters may be displayed within a visual rebate element. At least a portion of the associating by the manufacturer of the rebate with the item may involve the visual rebate element. A buyer may then select the visual rebate element provided by a third party system (e.g., promotional system). The buyer may then be directed to the item on a sales system of the seller. In addition, the buyer may be directed to at least one of the plurality of rebate parameters. The visual rebate element, may be, for example, a banner ad.

In one embodiment, the seller may wait to receive an amount corresponding the purchase amount and the rebate amount before fulfilling the purchase request.

Alternatively, a method of processing a coupon may comprise, for example, the following. A first party offers an item online for sale at a sales price amount. A coupon of a second party is associated with the item, the coupon having a coupon amount. A purchase request is received from a buyer for the item being offered online. The purchase request is responded to by requiring the buyer to pay a purchase amount corresponding to the sales price amount less the coupon amount for the item. And the second party electronically pays a payment amount corresponding to the coupon amount to the first party.

The purchase amount may be, for example, the sales price amount less the coupon amount. In addition, the purchase amount may also include a service charge amount. The purchase amount may alternatively be, for example, an amount lower than the sales price amount, but greater than the sales price amount less the coupon amount.

In one embodiment, the second party may control the coupon. For example, the coupon amount or a parameter of the coupon may be adjusted, or the coupon may be cancelled altogether.

The first party may also electronically collect the purchase amount, which again may be, for example, the sales price amount less the coupon amount plus a service charge amount.

In addition, the second party may be electronically charged at least the coupon amount, which may comprise, for example, the coupon amount plus a service charge amount. A portion of the service charge amount may further be provided to the first party. Also, at least a portion of the service charge amount may be provided for services rendered by a promotion system.

In one embodiment, an account of the buyer is charged for the purchase amount. In this case, at least a portion of the charged amount may also be provided to the first party. The charging of the buyer's account may be performed, for example, via a promotion system.

When the buyer's account is charged an amount corresponding to the sales price amount less the coupon amount, the account may also be credited for an amount corresponding to the coupon amount. In addition, when the purchase amount includes a service charge amount, the buyer's account may additionally be charged for the service charge amount.

In one embodiment, the buyer may interact online to cause payment to the first party of an amount corresponding the sales price amount less the coupon amount. The second party may then electronically pay the rebate amount to the first party. Such paying may be performed directly or via a promotion system.

In one embodiment, an account may be established for the second party for paying at least the coupon amount. Such payment may be assisted by a promotion system. The account established for the second party may be associated with the promotion system or be independent of the promotion system.

The method may also comprise delivering, by a web server, the coupon to a browser of the buyer. Such coupon may be one of a plurality of coupons delivered by the web server. The web server may be that of a promotion system or a system of the first party. When it is a system of the first party, the system may be an affiliate system, a non-seller system or a coupon system offering only promotional items for sale. In fact, in either case, the system may be a coupon type system offering only promotional items.

The method may also comprise selecting a potential buyer, and delivering the coupon to the selected buyer. Such delivery may be performed, for example, via email. The selection may be, for example, based on a previous purchase history of the selected buyer or on a registration of the selected buyer. The second party, for example, may perform the selection.

The method may further comprise delivering the coupon to a selected buyer with at least one other of the second party's coupons. Also, a shopping cart containing the item for sale and at least one other item for sale may be constructed. A promotion system, for example, may identify the item in the shopping cart, and the response to the purchase request occurs after the item is identified.

In one embodiment, the coupon comprises a plurality of coupon parameters. At least one of the plurality of coupon parameters may be displayed within a visual coupon element. At least a portion of the associating by the second party of the coupon with the item may involve the visual coupon element. A buyer may then select the visual coupon element provided by a third party system (e.g., promotional system). The buyer may then be directed to the item on a sales system of the first party. In addition, the buyer may be directed to at least one of the plurality of coupon parameters. The visual coupon element, may be, for example, a banner ad.

In one embodiment, the first party may wait to receive an amount corresponding the purchase amount and the coupon amount before fulfilling the purchase request.

The method may alternatively comprise, for example, the following. A first party offers an item online for sale at a sales price amount. A promotion of a second party is associated with the item, the promotion having a promotion amount. A purchase request is received from a buyer for the item being offered online. The purchase request is responded to by requiring the buyer to pay a purchase amount corresponding to the sales price amount less the promotion amount for the item. The second party electronically pays a payment amount corresponding to the promotion amount to the first party. And the first party receives an amount corresponding to the purchase amount and the payment amount before fulfilling the purchase request.

In one embodiment, the promotion is a rebate and in another the promotion is a coupon. The purchase amount may be, for example, the sales price amount less the coupon amount. In addition, the purchase amount may also include a service charge amount. The purchase amount may alternatively be, for example, an amount lower than the sales price amount, but greater than the sales price amount less the promotion amount.

In one embodiment, the second party may control the promotion. For example, the promotion amount or a parameter of the promotion may be adjusted, or the promotion may be cancelled altogether.

The first party may also electronically collect the purchase amount, which again may be, for example, the sales price amount less the promotion amount plus a service charge amount. In other words, the first party may receive payment (e.g., the sales price amount less the promotion amount) electronically.

In addition, the second party may be electronically charged at least the promotion amount, which may comprise, for example, the promotion amount plus a service charge amount. A portion of the service charge amount may further be provided to the first party. Also, at least a portion of the service charge amount may be provided for services rendered by a promotion system.

In one embodiment, an account of the buyer is charged for the purchase amount. In this case, at least a portion of the charged amount may also be provided to the first party. The charging of the buyer's account may be performed, for example, via a promotion system.

When the buyer's account is charged an amount corresponding to the sales price amount less the promotion amount, the account may also be credited for an amount corresponding to the promotion amount. In addition, when the purchase amount includes a service charge amount, the buyer's account may additionally be charged for the service charge amount.

In one embodiment, the buyer may interact online to cause payment to the first party of an amount corresponding the sales price amount less the promotion amount. The second party may then electronically pay the promotion amount to the first party. Such paying may be performed directly or via a promotion system.

In one embodiment, an account may be established for the second party for paying at least the promotion amount. Such payment may be assisted by a promotion system. The account established for the second party may be associated with the promotion system or be independent of the promotion system.

The method may also comprise delivering, by a web server, the promotion to a browser of the buyer. Such promotion may be one of a plurality of promotions delivered by the web server. The web server may be that of a promotional system or a system of the first party. When it is a system of the first party, the system may be an affiliate system, a non-seller system or a promotion system offering only promotional items for sale. In fact, in either case, the system may be a promotion type system offering only promotional items.

The method may also comprise selecting a potential buyer, and delivering the promotion to the selected buyer. Such delivery may be performed, for example, via email. The selection may be, for example, based on a previous purchase history of the selected buyer or on a registration of the selected buyer. The second party, for example, may perform the selection.

The method may further comprise delivering the promotion to a selected buyer with at least one other of the second party's promotions. Also, a shopping cart containing the item for sale and at least one other item for sale may be constructed. A promotion system, for example, may identify the item in the shopping cart, and the response to the purchase request occurs after the item is identified.

In one embodiment, the coupon comprises a plurality of promotion parameters. At least one of the plurality of promotion parameters may be displayed within a visual promotion element. At least a portion of the associating by the second party of the promotion with the item may involve the visual promotion element. A buyer may then select the visual promotion element provided by a third party system (e.g., promotion system). The buyer may then be directed to the item on a sales system of the first party. In addition, the buyer may be directed to at least one of the plurality of promotion parameters. The visual promotion element, may be, for example, a banner ad.

Another method of processing a promotion may comprise the following. A promotion of a second party is associated with an item, the promotion having a promotion value. A first party offers the item online for sale at a sales price amount without advertising the promotion of the second party. A purchase request is received from a buyer for the item being offered online. The purchase request is responded to by requiring the buyer to pay a purchase amount corresponding to the sales price amount. The buyer's payment is responded to by electronically communicating an indication of the buyer's payment to the second party. And the second party delivers the promotion value to the buyer after receiving the indication of the buyer's payment.

In one embodiment, the second party is a promotion system, which may or may not be managed by a third party. The purchase amount may be, for example, the sales price amount. In addition, the purchase amount may also include a service charge amount.

In one embodiment, the second party may control the promotion. For example, the promotion value or a parameter of the promotion may be adjusted, or the promotion may be cancelled altogether.

The promotion value may, for example, be delivered electronically. In addition, the second party may be electronically charged a service charge amount. A portion of the service charge amount may further be provided to the first party. Also, at least a portion of the service charge amount may be provided for services rendered by a promotion system.

In one embodiment, an account of the buyer is charged for the purchase amount. In this case, at least a portion of the charged amount may also be provided to the first party. In the case where the purchase amount includes a service charge amount, the buyer's account may additionally be charged for the service charge amount. The charging of the buyer's account may be performed, for example, via a promotion system.

In one embodiment, the buyer may interact online to cause payment to the first party of an amount corresponding the sales price amount. Such paying may be performed directly or via a promotion system. The delivering of the promotion value may also be assisted by a promotion system.

The method may also comprise delivering, by a web server, the promotion to a browser of the buyer. Such promotion may be one of a plurality of promotions delivered by the web server. The web server may be that of a promotion system or a system of the first party. When it is a system of the first party, the system may be an affiliate system, a non-seller system or a promotion system offering only promotional items for sale. In fact, in either case, the system may be a promotion type system offering only promotional items.

The method may also comprise selecting a potential buyer, and delivering the promotion to the selected buyer. Such delivery may be performed, for example, via email. The selection may be, for example, based on a previous purchase history of the selected buyer or on a registration of the selected buyer. The second party, for example, may perform the selection.

The method may further comprise delivering the promotion to a selected buyer with at least one other of the second party's promotions. Also, a shopping cart containing the item for sale and at least one other item for sale may be constructed. A promotion system, for example, may identify the item in the shopping cart, and the response to the purchase request occurs after the item is identified.

In one embodiment, the coupon comprises a plurality of promotion parameters. At least one of the plurality of promotion parameters may be displayed within a visual promotion element. At least a portion of the associating by the second party of the promotion with the item may involve the visual promotion element. A buyer may then select the visual promotion element provided by a third party system (e.g., promotional system). The buyer may then be directed to the item on a sales system of the first party. In addition, the buyer may be directed to at least one of the plurality of promotion parameters. The visual promotion element, may be, for example, a banner ad.

The method may alternatively comprise the following. An item is offered for sale on a first online system of a seller, where the first online system requires payment of a sales price amount for the item. A promotion having a promotion amount is associated with the item. A purchase request is received from a buyer for the item being offered online. The buyer is required to pay a purchase amount corresponding to the sales price amount less the promotion amount for the item. A second online system electronically facilitates payment, through communicative coupling with the first online system, of a payment amount corresponding to the promotion amount. And the seller receives an amount corresponding to the purchase amount and the payment amount.

In one embodiment the promotion is a rebate and in another the promotion is a coupon. The purchase amount may be, for example, the sales price amount less the promotion amount. In addition, the purchase amount may further include a service charge amount.

The facilitation mentioned above may be achieved by the gathering of sales transaction information from the first online system. Such facilitation may further include the automatic generation of an invoice corresponding to the sales transaction information gathered.

Facilitation may also be achieved by the payment of an amount corresponding to the promotion amount. Facilitation in this case may further include the automatic generation of an invoice corresponding to the promotion amount. In addition, it may include the automatic generation of an offsetting accounting entry corresponding to the promotion amount. Such offsetting accounting entry may be, for example, a debit entry or a credit entry.

The method may also permit control of the promotion via the second online system. In this a service charge may also be assessed for services rendered by the second online system.

Figure 10:
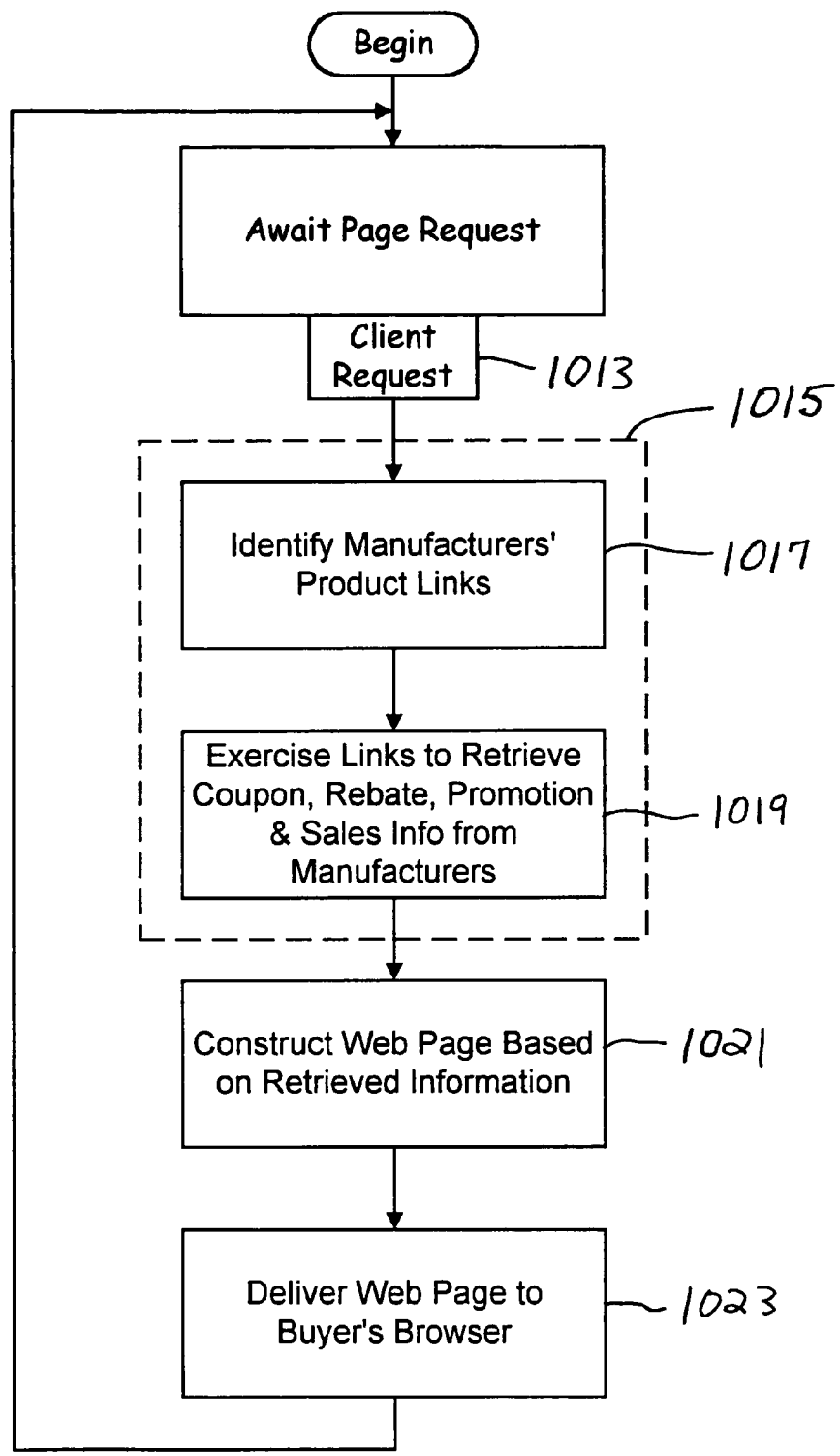
FIG. 10 is a flow diagram illustrating the exemplary operation of a retail product or service sales server with a client and with a plurality of manufacturer servers to support a promotion such as a rebate or coupon.

FIG. 10 is a flow diagram illustrating the exemplary operation of a retail product or service sales server with a client and with a plurality of manufacturer servers to support a promotion such as a rebate or coupon. Specifically, a sales server waits for a client, typically through web-browser interaction, to request information about one or more products or services from one or more manufacturers, suppliers or service providers. In a real time mode of operation, when such a client request is received as indicated by the block 1013, the sales server responds by performing the operations within a block 1015.

In particular, the sales server identifies the servers of the manufacturers, suppliers and/or service providers (hereinafter "source servers") underlying the client request at a block 1017. Thereafter, at a block 1019, the sales server establishes secure communication with such source servers to retrieve promotion information, including terms and conditions for such promotions as "buy one item, get a different item for free," "buy 2 get one free," coupons, rebates, etc., along with related sales information, including, but not limited to pricing, inventory, images, descriptions, warranty information, licensing information, third party reviews, and links to further information.

In the real time mode of operation, the retrieval process within the block 1015 occurs upon receiving each client request. In a periodic mode of operation, the sales server only performs the functions of block 1015, for example, once every 24 hour period. Of course any period may be possible. In a aged mode of operation, the sales server performs the functions of the block 1015 only if the information underlying the client request has not been retrieved for a period of time. In other words, if a client request that occurred fifteen minutes earlier caused the retrieval of information from a source server, then such information need not be requested again by the source server at least for a predetermined duration of time such as for six hours. Thus, for example, a single request from a client may cause the retrieval of locally stored information (recently retrieved) regarding some products or services along with remotely retrieved information regarding other products or services (from source servers) that have old information stored locally, with the old information being updated in the process.

Regardless of the mode of operation of the sales server, at a block 1021, the sales server uses the retrieved product and/or service information to construct a web page which is delivered to the client browser for viewing at a block 1023. Of course, such construction and delivery may take any other form. For example, the information may be constructed for printing, emailed, faxed, voice synthesized for telephone playback, etc. Many other construction and delivery mechanisms are well known and may be used.

Figure 11:
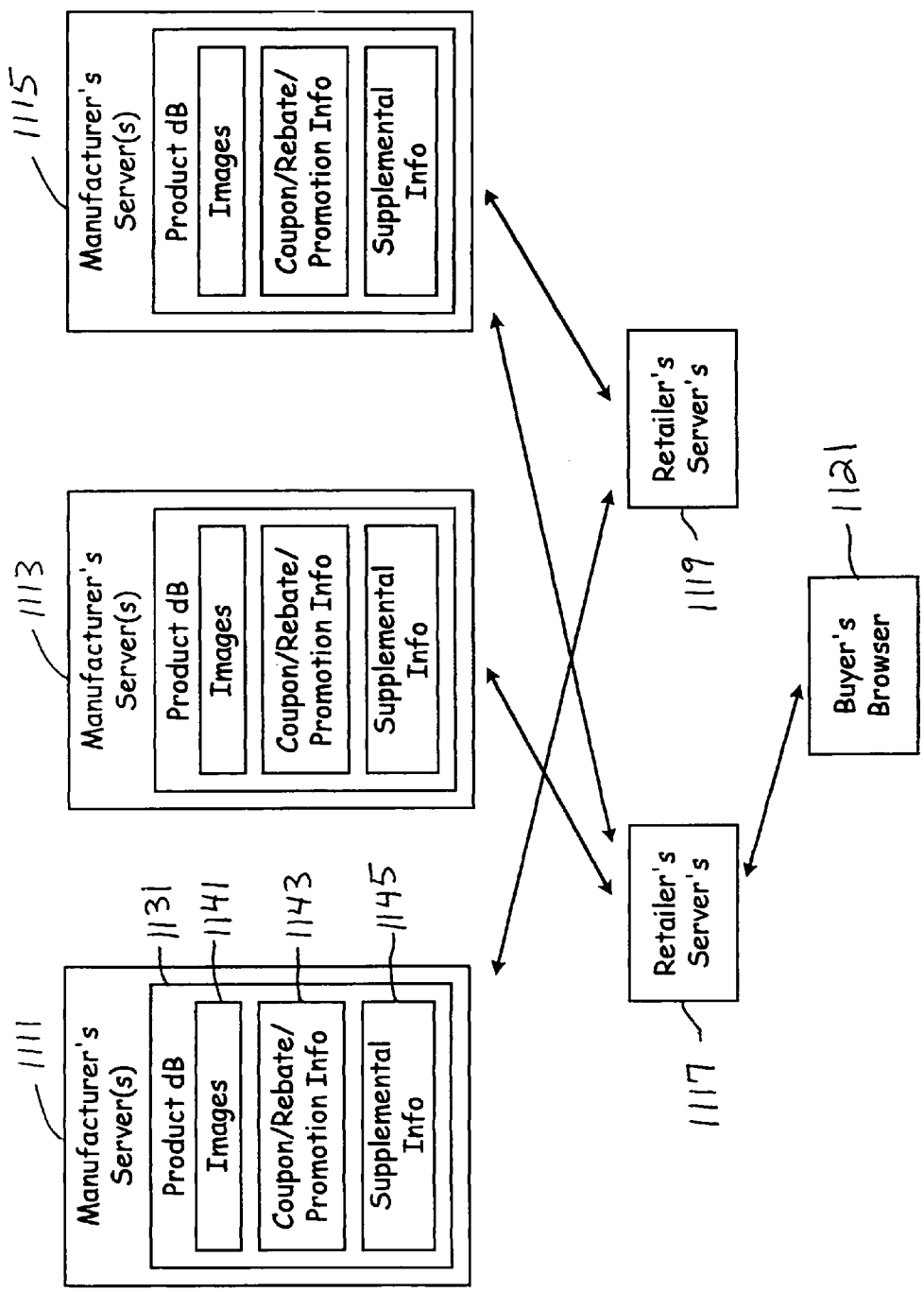
FIG. 11 is a schematic block diagram of exemplary system level interaction that illustrates the functionality described in relation to FIG. 10.

FIG. 11 is a schematic block diagram of exemplary system level interaction that illustrates the functionality described in relation to FIG. 10. A buyer (or client) access one of a plurality of sales servers, such as sales servers 1117 and 1119, via Internet by sending a request for a web page or web page content through a buyer's browser 1121.

In response, the sales server 1117 (which may comprise one or more servers) will respond by constructing the web page or page content from product and/or service information underlying the buyer's request. As mentioned in reference to FIG. 10, the sales server 1117 may retrieve the required product and/or service information (hereinafter "sales information") from one or more of a plurality of source servers, such as source servers 1111, 1113 and 1115, and/or from memory local to the sales server 1117. The specific timing of such retrieval of sales information depends entirely on the mode of operation in which the sales server is operating, as previously described.

To retrieve sales information, the sales server 1117 establishes a secure link with one or more of the source servers 1111, 1113 and 1115. Each sales server 1111 typically comprises, among other things, a product or services database 1131 which itself may contain images 1141, promotion information 1143, and other sales information 1145, for example. Thus, after receiving a request from the buyer via the buyer's browser 1121, the sales server 1117, if operating in the aged mode, will respond by first looking to local storage to determine whether the sales information underlying the request exist locally. For portions of the sales information that exists locally and is not too old, such information is used in the construction of a response to be sent to the buyer's browser 1121. For all portions of the sales information that is too old or does not exist locally, the sales server 1117 establishes secured links with one or more of the source servers 1111, 1113 and 1115 to retrieve such information. Similar operation for the other modes of operation are also possible.

Moreover, in some embodiments, the mode of operation of the sales server is defined by the sales information itself. For example, a buyer's request may require that two products from two different manufacturers be displayed in a single web page. The first product may require the aged mode of operation, while the second product may require a real time mode. Similarly, any portion of the sales information may define its own required mode. For example, general image information may operate under a periodic mode while the price or an associated promotion might require the real time mode for control purposes.

Fall back modes are also contemplated when the desired mode fails. For example, if a real time mode fails, the sales server may be authorized to resort to an aged or periodic mode of operation, so long as the conditions underlying conditions for use are met. Other variations such as modified or combined versions of the modes or fall back strategies identified above are also contemplated and will be apparent to one skilled in the art after considering such disclosed modes.

The secured communication from the sales servers to the source servers may occur through an ASP architecture. A variety of encryption and compression techniques can be used to provide secure and minimal bandwidth utilization between servers.

The source servers 1111, 1113 and 1115 are thus able to control and modify any of the sales content without worrying about the buyer basing a purchase on outdated data existing at the sales servers 1117 and 1119. For example, a coupon can be tracked by the source server 1111 for a product sold by the sales servers 1117 and 1119. Once a certain volume is reached, as counted through direct feedback from the sales servers 1117 and 1119 as sales occur, the source server 1111 can remove the coupon, ending this promotion. The source server 1111 can make this decision automatically based on a predetermined number or a number calculated based on current warehouse inventory, for example.

Although a system and method according to the present invention has been described in connection with various embodiment, it is not intended to be limited to the specific form set forth herein, but on the contrary, it is intended to cover such alternatives, modifications, and equivalents, as can be reasonably included within the spirit and scope of the invention as defined by this disclosure and appended diagrams.

We claim:

1. A method of processing a promotion from a first party, the first party having a first system, the method comprising:
    offering, by a second system of a second party, an item for sale online at a sales price amount, the item for sale having associated with it, by the second system of the second party, a promotion from the first party, the promotion having a promotion amount, wherein the second system is distinct from the first system and the second party is distinct from the first party;
    receiving, by the second system, an online purchase request from a buyer for the item for sale;
    responding, by the second system, to the online purchase request by collecting from the buyer a purchase amount corresponding to the sales price amount less the promotion amount; and
    causing, by the second system, shipment by the second party of the item for sale to the buyer.

2. A method of processing a promotion for a first party, the first party having a first system, the method comprising:
    offering, by a second system of a second party, an item for sale online, wherein the item has been acquired by the second party from the first party, the item for sale having associated with it a promotion from the first party, the promotion having a promotion amount, wherein the second system is distinct from the first system and the second party is distinct from the first party;
    receiving, by the second system, an online purchase request from a buyer for the item for sale;
    responding, by the second system, to the online purchase request by collecting from the buyer a purchase amount corresponding to a sales price amount less the promotion amount; and
    collecting, by the second system, a service fee associated with the online purchase request.

3. The method of claim 2 wherein the service fee is collected from the buyer.

4. The method of claim 3 wherein a first amount is defined by the sales price less the promotion amount, and the purchase amount collected from the buyer equals the first amount plus the service fee.

5. The method of claim 2 wherein the service fee is collected from the first party.

* * * * *